(12) United States Patent
Glass et al.

(10) Patent No.: US 11,429,116 B2
(45) Date of Patent: Aug. 30, 2022

(54) SYSTEMS AND METHODS FOR AUTOMATED, LIGHTER-THAN-AIR AIRBORNE PLATFORM

(71) Applicant: Altaeros Energies, Inc., Somerville, MA (US)

(72) Inventors: Benjamin William Glass, Somerville, MA (US); Benjamin Ryan Bollinger, Topsfield, MA (US); Igor Braverman, Boston, MA (US); Peter Carleton Mitton, Jr., Brookline, MA (US); Ephraim R. Lanford, Cambridge, MA (US)

(73) Assignee: Altaeros Energies, Inc., Somerville, MA (US)

( * ) Notice: Subject to any disclaimer, the term of this patent is extended or adjusted under 35 U.S.C. 154(b) by 234 days.

(21) Appl. No.: 16/342,963

(22) PCT Filed: Oct. 18, 2017

(86) PCT No.: PCT/US2017/057177
§ 371 (c)(1),
(2) Date: Apr. 17, 2019

(87) PCT Pub. No.: WO2018/075632
PCT Pub. Date: Apr. 26, 2018

(65) Prior Publication Data
US 2020/0057455 A1  Feb. 20, 2020

Related U.S. Application Data

(60) Provisional application No. 62/409,842, filed on Oct. 18, 2016.

(51) Int. Cl.
*G05D 1/10* (2006.01)
*B64F 5/60* (2017.01)
*B64B 1/50* (2006.01)

(52) U.S. Cl.
CPC ............... *G05D 1/101* (2013.01); *B64B 1/50* (2013.01); *B64F 5/60* (2017.01)

(58) Field of Classification Search
CPC ........ G05D 1/101; G05D 1/0866; B64F 5/60; B64B 1/50; B64B 1/56; B64C 2201/148; B64C 2201/022; B64C 39/022
(Continued)

(56) References Cited

U.S. PATENT DOCUMENTS

| 653,221 A | 7/1900 | Deydier |
| 1,724,890 A | 8/1929 | Upson |

(Continued)

FOREIGN PATENT DOCUMENTS

| EP | 0 045 202 | 2/1982 |
| EP | 0 935 068 | 8/1999 |

(Continued)

OTHER PUBLICATIONS

Invitation to Pay Additional Fees dated Dec. 26, 2017 in connection with International Application No. PCT/US2017/057177.
(Continued)

*Primary Examiner* — Jonathan M Dager
*Assistant Examiner* — Jean W Charleston
(74) *Attorney, Agent, or Firm* — Wolf, Greenfield & Sacks, P.C.

(57) ABSTRACT

Embodiments disclosed herein enable routine autonomous execution of at least some major phases of aerostat operation in response to commands from human or automated external operators, a built-in decision-making capacity, or both. Various embodiments combine one or more actively controlled tethers, aerodynamic aerostat control surfaces, mechanical assistive devices (e.g., jointed arms attached to a ground station), and/or active propulsors attached to the aerostat to govern aerostat behavior during launch, flight, and landing
(Continued)

Side view

Front view phases of operation. Some embodiments enable automatic autonomous performance of all phases of routine post-commissioning aerostat operation, including launch, flight, and landing, without any routine need for availability of a human crew.

18 Claims, 21 Drawing Sheets

(58) Field of Classification Search
USPC .......................................................... 701/16
See application file for complete search history.

(56) References Cited

U.S. PATENT DOCUMENTS

| | | | |
|---|---|---|---|
| 1,812,237 A | 6/1931 | Garcia | |
| 1,823,466 A | 9/1931 | Powelson et al. | |
| 1,845,229 A | 2/1932 | Bradshaw | |
| 1,848,828 A | 3/1932 | Griffin | |
| 2,704,193 A | 3/1955 | Alard | |
| 3,972,492 A | 8/1976 | Milne | |
| 3,972,493 A | 8/1976 | Milne | |
| 4,165,468 A | 8/1979 | Fry et al. | |
| 4,166,596 A | 9/1979 | Moulton, Jr. et al. | |
| 4,207,026 A | 6/1980 | Kushto | |
| 4,285,481 A | 8/1981 | Biscomb | |
| 4,309,006 A | 1/1982 | Biscomb | |
| 4,350,896 A | 9/1982 | Benoit | |
| 4,350,897 A | 9/1982 | Benoit | |
| 4,350,898 A | 9/1982 | Benoit | |
| 4,350,899 A | 9/1982 | Benoit | |
| 4,450,364 A | 5/1984 | Benoit | |
| 4,789,302 A | 12/1988 | Gruzling | |
| 4,832,571 A | 5/1989 | Carrol | |
| 5,080,302 A | 1/1992 | Hoke | |
| 5,431,359 A | 7/1995 | Belie | |
| 5,509,624 A | 4/1996 | Takahashi | |
| 5,836,738 A | 11/1998 | Finney | |
| 6,224,015 B1 | 5/2001 | Reinhard | |
| 6,382,904 B1 | 5/2002 | Orlov et al. | |
| 6,523,781 B2 | 2/2003 | Ragner | |
| 7,188,808 B1 | 3/2007 | Olson | |
| 7,275,719 B2 | 10/2007 | Olson | |
| 7,775,483 B2 | 8/2010 | Olson | |
| 8,018,079 B2 | 9/2011 | Kelly | |
| 8,100,366 B2 | 1/2012 | Milanese et al. | |
| 8,253,265 B2 | 8/2012 | Glass | |
| 8,539,746 B2 | 9/2013 | Ippolito | |
| 8,602,349 B2 | 12/2013 | Petrov | |
| 8,624,421 B2 | 1/2014 | Ippolito | |
| 2002/0040948 A1 | 4/2002 | Ragner | |
| 2007/0013196 A1 | 1/2007 | Chen | |
| 2007/0120004 A1 | 5/2007 | Olson | |
| 2007/0120005 A1 | 5/2007 | Olson | |
| 2008/0048453 A1 | 2/2008 | Arnick | |
| 2009/0072092 A1 | 3/2009 | Griffith et al. | |
| 2009/0230236 A1 | 9/2009 | Tillotson | |
| 2010/0032947 A1 | 2/2010 | Bevirt | |
| 2010/0213718 A1 | 8/2010 | Kelly | |
| 2011/0035149 A1* | 2/2011 | McAndrew | G05D 1/0038 701/466 |
| 2012/0049533 A1 | 3/2012 | Kelly | |
| 2013/0075523 A1* | 3/2013 | Vermillion | B64B 1/00 244/96 |
| 2014/0012433 A1 | 1/2014 | Vojtech et al. | |
| 2015/0053255 A1 | 2/2015 | Goldstein | |
| 2015/0083849 A1 | 3/2015 | Glass et al. | |
| 2015/0298806 A1* | 10/2015 | Vander Lind | F03D 9/008 290/55 |
| 2015/0329204 A1* | 11/2015 | Nelson | B64C 27/26 244/6 |
| 2016/0122014 A1 | 5/2016 | Jang | |
| 2016/0139601 A1 | 5/2016 | Vermillion et al. | |
| 2016/0207625 A1* | 7/2016 | Judas | B64C 3/38 |
| 2017/0043872 A1* | 2/2017 | Whitaker | B64C 39/024 |
| 2017/0129600 A1* | 5/2017 | Rancourt | B64C 39/024 |
| 2017/0158342 A1* | 6/2017 | Ishii | G05D 1/0072 |
| 2020/0024000 A1 | 1/2020 | Vermillion et al. | |

FOREIGN PATENT DOCUMENTS

| | | | |
|---|---|---|---|
| GB | 2 164 910 A | 4/1986 | |
| JP | 1986-085297 A2 | 4/1986 | |
| JP | 1988-227499 A2 | 9/1988 | |
| JP | 1988-235197 A | 9/1988 | |
| JP | 1988-235198 A | 9/1988 | |
| JP | 2009-511198 A | 11/1997 | |
| JP | 2003-137189 A2 | 5/2003 | |
| KR | 10-2010-0065856 A | 4/2012 | |
| WO | WO 00/63074 A1 | 10/2000 | |
| WO | WO 2010/006433 A1 | 1/2010 | |
| WO | WO 2011/012996 A2 | 2/2011 | |
| WO | WO 2013/043586 A2 | 3/2013 | |
| WO | WO 2013/109689 A1 | 7/2013 | |
| WO | WO-2013109689 A1 * | 7/2013 | B64B 1/52 |
| WO | WO 2015/038697 A2 | 3/2015 | |

OTHER PUBLICATIONS

International Search report and Written Opinion dated Feb. 22, 2018 in connection with International Application No. PCT/US2017/057177.
International Preliminary Report on Patentability dated May 2, 2019 in connection with International Application No. PCT/US2017/057177.
EP 17862190.0, May 7, 2020, Extended European Search Report.
Extended European Search Report dated May 7, 2020 in connection with European Application No. 17862190.0.
U.S. Appl. No. 15/776,552, filed May 16, 2018, Vermillion et al.
PCT/US2012/055898, Mar. 18, 2013, International Search Report and Written Opinion.
PCT/US2012/055898, Apr. 3, 2014, International Preliminary Report on Patentability.
PCT/US2013/021837, May 13, 2013, International Search Report and Written Opinion.
PCT/US2013/021837, Jul. 31, 2014, International Preliminary Report on Patentability.
EP 13738570.4, Sep. 28, 2015, Extended European Search Report.
PCT/US2016/062266, Feb. 28, 2017, International Search Report and Written Opinion.
PCT/US2016/062266, May 31, 2018, International Preliminary Report on Patentability.
International Search Report and Written Opinion dated Mar. 18, 2013 for corresponding International Application No. PCT/US2012/055898.
International Preliminary Report on Patentability dated Apr. 3, 2014 for corresponding International Application No. PCT/US2012/055898.
International Search Report and Written Opinion dated May 13, 2013 for corresponding International Application No. PCT/US2013/021837.
International Preliminary Report on Patentability dated Jul. 31, 2014 for corresponding International Application No. PCT/US2013/021837.
International Search Report and Written Opinion dated Feb. 28, 2017 for corresponding International Application No. PCT/US2016/062266.
International Preliminary Report on Patentability dated May 31, 2018 for corresponding International Application No. PCT/US2016/062266.
Extended European Search Report dated Sep. 28, 2015 for corresponding European Application No. 13738570.4.

* cited by examiner

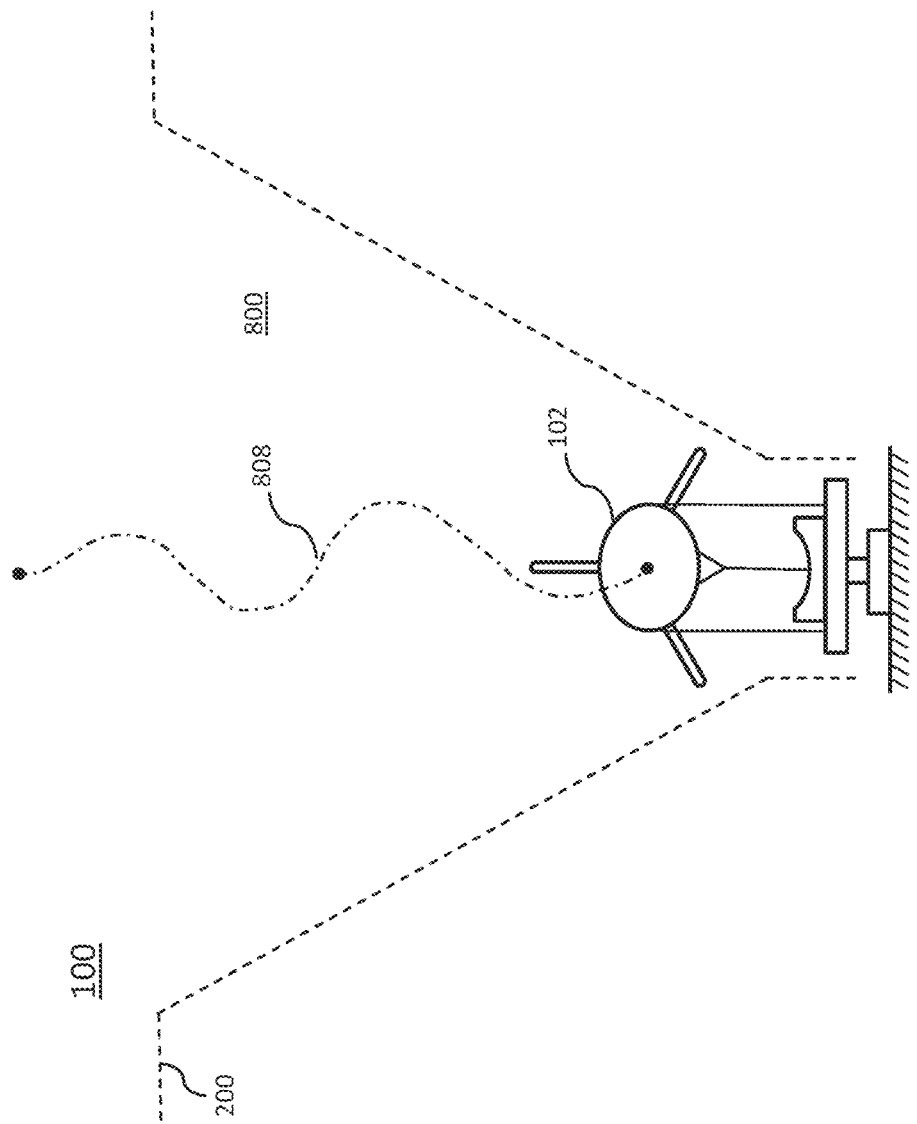

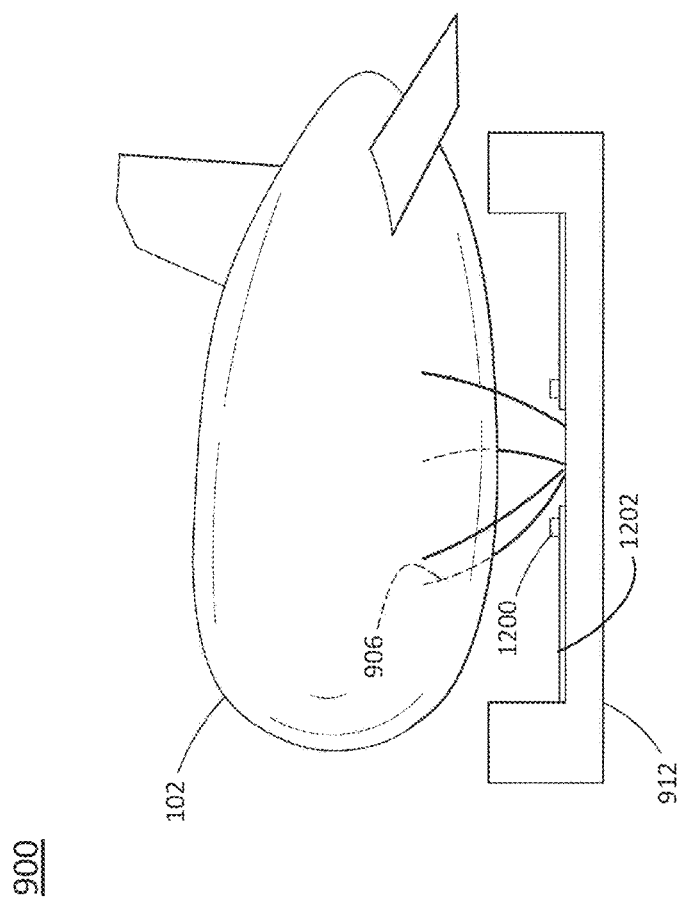

SYSTEMS AND METHODS FOR AUTOMATED, LIGHTER-THAN-AIR AIRBORNE PLATFORM

RELATED APPLICATIONS

This application is a national stage filing under 35 U.S.C. § 371 of international application number PCT/US2017/057177, filed on Oct. 18, 2017, which claims priority under 35 U.S.C. § 119(e) to U.S. provisional patent application No. 62/409,842, filed Oct. 18, 2016, the entire contents of each of which are incorporated herein by reference.

FIELD OF INVENTION

Embodiments of the present invention relate to aerostats, aerostat ground stations, aerostat control systems, and methods of controlling tethered aerostats.

DISCUSSION OF THE RELATED ART

Moored (i.e., tethered) lighter-than-air craft, i.e., aerostats, have had widespread use in several actual and potential applications, such as surveillance, advertising, telecommunications, and weather monitoring. There has also been increased interest in employing tethered aerostats or kite-based systems for lofting relatively small wind turbines, as such arrangements to deliver wind energy at lower cost than traditional tower-mounted turbines of comparable size and altitude, and can easily access higher altitudes (and thus steadier, stronger winds) than any practical tower system.

That aerostats can easily achieve altitudes comparable to or higher than traditional fixed towers is advantageous for several reasons, including greater coverage of earth surface at favorable angles of view from higher altitudes, greater maximum line-of-sight, and the like. Aerostat altitude is easily adjustable, while traditional tower height is not. Aerostat deployment requires little or no ground site preparation, and aerostat location is easily changed, as opposed to laborious assembly and disassembly of a tower. Given appropriate technology development, and especially for short-term applications, the capital cost of deploying an aerostat system can be much lower than that of constructing a tower. Kites offer some of the advantages of aerostats, but aerostat-based systems have the intrinsic advantage that their well-established core technology uses a lighter-than-air (e.g., helium-filled) lifting body to provide support even in the absence of wind.

SUMMARY

To more fully realize the advantages of aerostats, reliable control of aerostat launch, flight, and landing are required. For example, in various applications it is desirable that the altitude of the aerostat be controlled and that the aerostat remain approximately steady during operation. Early systems concentrated on altitude control for tethered aerostats, providing a configuration for which the aerostat is controlled to a particular altitude. An approach employing two or more actuators originating from a single actuator platform on the ground to control aerostat altitude and at least one independent attitude variable was shown and described in U.S. Pat. No. 9,187,165 B2, "SYSTEMS AND METHODS FOR ATTITUDE CONTROL OF TETHERED AEROSTATS," the entire disclosure of which is incorporated herein by reference.

However, even advanced prior methods for altitude and attitude control have not overcome certain disadvantages of aerostat systems. Most notably, human crews are still required for the launch and landing of aerostats. Because aerostats may be damaged or destroyed by severe weather or other circumstances, crews must be ready to lower and dock them on short notice at any time of day or night. Re-launch when conditions are again favorable also requires a human crew. Such operations may be necessary at any time, mandating round-the-clock availability of a human crew. This raises aerostat operating costs. Moreover, docking operations can be hazardous for human crew members, especially in extreme weather conditions, precisely when aerostat landing is most desirable.

There is therefore a need for an aerostat system and method of operating a tethered lighter-than-air craft that eliminates the need for continual human crew availability while also realizing all the advantages of aerostats over towers and kites for various payloads.

Embodiments of the present invention may address some of the limitations of the prior art by providing an aerostat system that enables one or more of automated launching, flying, and landing. Various embodiments of the aerostat system comprise one or more of (1) a lighter-than-air craft (e.g, an aerostat) that may carry one or more payloads, (2) a ground station, which may be relocatable in some embodiments, that anchors the aerostat, typically powers, controls, and communicates with the aerostat, and communicates with various users, observers, or operators, both human and computer, (3) one or more tethers that connect the aerostat to the ground station and may comprise load-bearing cables, conductors, data transmission lines, beacons, sensors, and other components, (4) actuators influencing the position and/or attitude of the aerostat by acting upon tethers, altering aerodynamic or other properties of the aerostat, or applying forces to the aerostat via propulsors, (5) actuators influencing other attributes of the aerostat or ground station, such as blowers and/or valves affecting the aerostat pressure or heaters affecting the temperature of the enclosed gas or other components, (6) various sensors, which may be located on the aerostat, the ground station, and/or elsewhere, (7) a computerized aerostat flight controller that may be located on board the aerostat, on board the ground station, or elsewhere, and that is in communication with the aerostat and/or the ground station and with various sensors and actuators relevant to operating the aerostat system, and (8) a computerized automated dispatch controller, located near the ground station in some embodiments or elsewhere in some other embodiments, that communicates with the aerostat flight controller, that exchanges information with various external entities, such as sensors, system operators, clients, and weather forecasting systems, and that comprises a built-in decision engine for accommodating aerostat operations to operator requests, fault conditions, weather conditions and forecasts, and other factors.

Embodiments of the invention enable routine autonomous execution of at least some major phases of aerostat operation in response to commands from human or automated external operators, a built-in decision-making capacity, or both. Various embodiments combine one or more actively controlled tethers, aerodynamic aerostat control surfaces, mechanical assistive devices (e.g., jointed arms attached to a ground station), and/or active propulsors attached to the aerostat to govern aerostat behavior during launch, flight, and landing phases of operation. Some embodiments of the invention enable automatic autonomous performance of all phases of routine aerostat operation, including launch, flight, and landing, without any routine need for availability of a human crew.

In one embodiment, a system for control of an aerostat includes a ground station and a first tether to connect a lighter-than-air balloon to the ground station. The system includes one or more sensors to determine an orientation of the balloon, one or more sensors to determine a location of the balloon, and one or more actuators to affect the orientation and/or location of the balloon. A flight controller is configured to receive information from the one or more orientation sensors, the one or more location sensors, and further configured to control the one or more actuators. An automated dispatch controller is configured to receive inputs from a source which is external to both the system and the balloon.

According to another embodiment, a method of controlling landing of an aerostat is disclosed. The aerostat is attached to a ground station with one or more tethers, and the method includes retracting the one or more tethers to bring the aerostat toward the ground station during a descend phase. The method also includes, upon the aerostat reaching a specified altitude, automatically transitioning to a capture mode during which the ground station makes physical contact with the aerostat and/or bridles attached to the aerostat. Further included is verifying physical contact of the ground station with the aerostat and/or bridles attached to the aerostat. Upon verified initial contact of the ground station with the aerostat and/or bridles attached to the aerostat, the method includes automatically transitioning to a dock mode during which the aerostat moves from an initial ground station contact position to a docked position on a cradle of the ground station or other docking surface.

In yet another embodiment, a method of determining a risk of a failure associated with an aerostat is disclosed. The method includes receiving a present measurement of each of one or more current wind conditions from a sensor positioned on an aerostat, receiving a value of each of one or more physical attributes of the aerostat, and receiving a value of each of one or more target physical set points of the aerostat. The method further includes determining an estimated risk of a failure based on at least: the present measurement of each of the one or more current wind conditions; the value of each of the one or more physical attributes of the aerostat; and the value of each of the one or more target physical set points of the aerostat.

According to a further embodiment, a bridle capture system for an aerostat bridle includes a bridle block having a plurality of bridles attached to the bridle block, and a tether attached to the bridle block. The bridle portion has higher portion and a lower portion, wherein the higher portion has a larger width than the lower portion, and the bridle block includes at least two side faces which are angled outwardly from a center of the block in the direction from the lower portion to the higher portion. The system also includes a bridle block catch positioned on a landing platform, the bridle block catch having a top opening with a width that is larger than the width of the bridle block at the lower portion.

These and other aspects of embodiments of the invention will be clarified with reference to the figures.

BRIEF DESCRIPTION OF DRAWINGS

In the drawings, like reference characters generally refer to the same parts throughout the different views. Also, the drawings are not necessarily to scale, emphasis instead generally being placed upon illustrating the principles of embodiments of the invention. In the following description, various embodiments of the present invention are described with reference to the following drawings, in which:

FIGS. 8A, 8B, and 8C are schematic depictions of the "cone of comfort" for an aerostat system.

FIGS. 12A and 12B are side views of the landing-and-capture system of FIG. 9 in two states of operation.

FIGS. 13A and 13B are views of a bridle-capture system in two states of operation, showing how self-alignment occurs.

DETAILED DESCRIPTION

Figure 1:
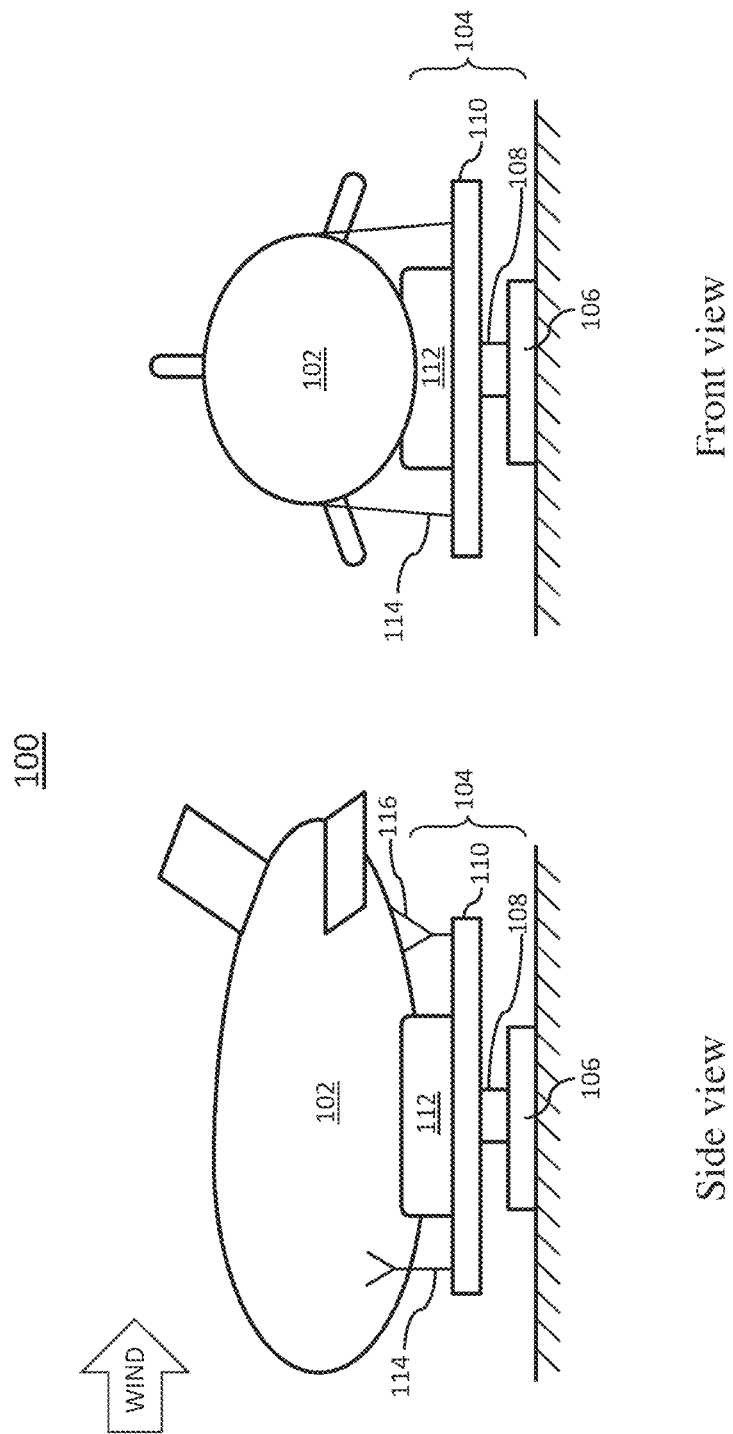
FIG. 1 is a schematic diagram of major mechanical components of an automated aerostat system.

FIG. 1 is a schematic diagram depicting two cross-sectional views of major mechanical components of an illustrative automated aerostat system 100 in a first state of operation according to an embodiment of the invention. The assembly 100 comprises an aerostat 102, here depicted in a docked or grounded state of operation, and a ground platform 104. The ground platform 104 comprises a fixed ground contactor or base 106, a bearing mechanism or rotator 108 that rotates around its vertical axis with respect to the base 106, a main platform 110 that rotates upon the rotator 108, and a cradle 112 within which the aerostat 102 rests when in a docked state. The cradle 112 may comprise a soft pad or pads possessing or possessing together a concavity or groove on its upper surface, or may comprise flat plates, nose cones, inflated tubes, bars, or other structures meant to interface with the aerostat while in the docked position. The aerostat 102 is connected to the main platform 110 by a number of tethers, e.g., tethers 114 and 116. The illustrative embodiment of FIG. 1 comprises three tethers (two fore, one aft); various embodiments comprise one, two, or more tethers. The tethers can be payed out or reeled in by mechanisms (e.g., winches), not depicted in FIG. 1, that are comprised by the main platform 110. The main platform 110 is substantially aligned with the aerostat 102 when the aerostat 102 is nested in the cradle 112 and is preferably approximately aligned with the aerostat 102 when the aerostat 102 is not in contact with the cradle 112 (i.e., when the aerostat 102 is launching, landing, or at flying altitude). In some embodiments, the main platform 110 is precisely aligned with the aerostat 102 when the aerostat 102 is nested in the cradle 112. Also, the assembly 100 points approximately into the wind at all times to minimize wind forces not acting along the long axis of the aerostat, thus minimizing total wind force on the system as well as system stability. Alignment is maintained by having the rotator 108 turn so that the main platform 110 and aerostat 102 point approximately into the wind at all times. Wind alignment can be maintained by an active system that detects the direction of incident wind and commands a motor to rotate the rotator 108 correspondingly; or, by a passive weather-vane-type system in which the torque exerted by non-axial wind forces on the linked system of aerostat 102, tethers (e.g., tethers 114, 116), and main platform 110 rotates the upper portions of the assembly 100 upon the rotator 108 to minimize this torque; or by a combination of these and/or active and passive alignment mechanisms.

The ground station 104 can also comprise various components not depicted in FIG. 1 in this and other embodiments, including electronic controllers, sensors, telecommunications devices, a power source or power-source connections, wheels, rails/tracks and associated carriage mechanisms, a multiplicity of pads rather than the single pad depicted in FIG. 1, an aerostat catch-and-release mechanism, a docking nose cone, and other components.

Figure 2B:
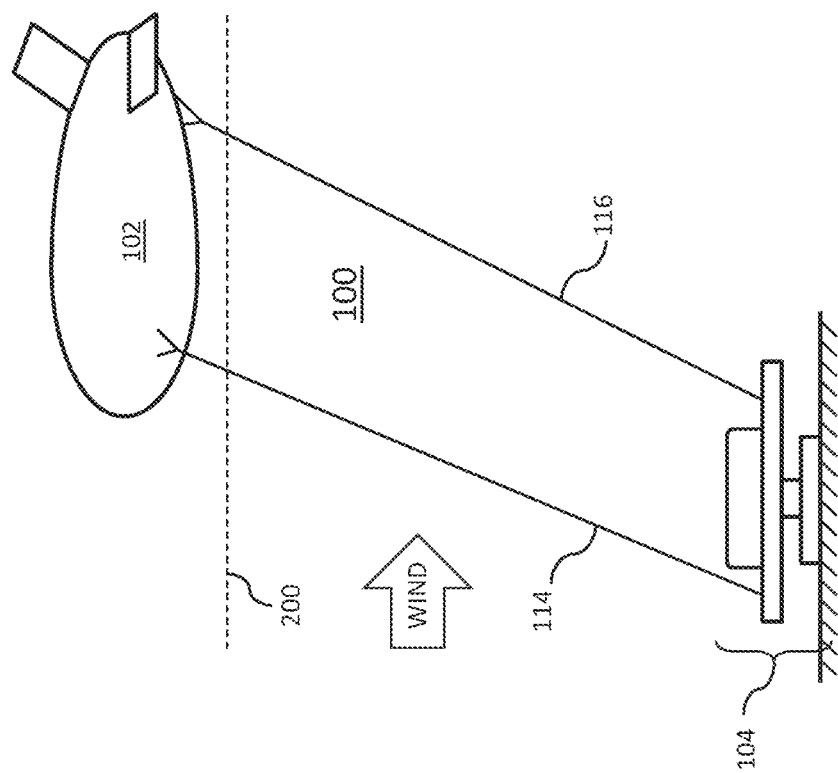
FIGS. 2A and 2B are schematic diagram depicting the aerostat system of FIG. 1 in two states of flight operation.
Figure 2A:
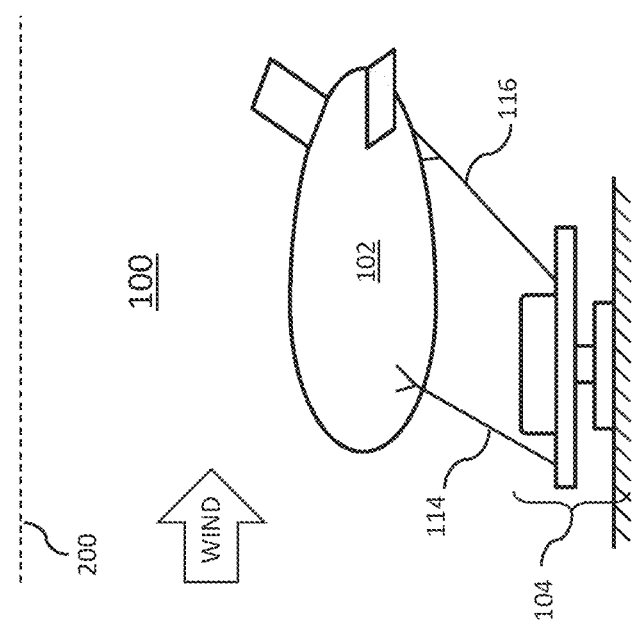

FIG. 2A is a side-view schematic of the assembly 100 of FIG. 1 in a second state of operation. In FIG. 2A, the aerostat 102 is at a low altitude, where "low" signifies that the aerostat is below a defined minimum flying altitude 200. The minimum flying altitude is an altitude above which the aerostat may fly and implement its automated flight processes, and may for example be equal to two to four times the length of the aerostat in some embodiments. In some embodiments, the minimum flying altitude may be three times the length of the aerostat. In some embodiments, the minimum flying altitude may not be related to the length of the aerostat. The minimum flying altitude may be outside the range of two to four times the aerostat length in some embodiments. A functional or mission requirement may be part of determining a minimum flying altitude in some embodiments, while in other embodiments a selection of a minimum flying altitude may be made without reference to aerostat characteristics, functional or mission requirements, or environmental circumstances. For example, a minimum flying altitude may be selected simply as a convenient altitude at which to transition control logic from launch control to flight control and/or flight control to land control. The state of operation depicted in FIG. 2A can occur during a landing process, whereby the aerostat 102 is drawn down from a higher altitude to the ground station 104 by reeling in the one or more tethers (e.g., tethers 114, 116), or during a launch process, whereby the aerostat 102 is released from the ground station 104 and flown to a higher altitude by paying out the tethers. Various embodiments provide for autonomous performance of landing and/or launching processes, where "autonomous" signifies that physical human presence on the site of the aerostat system 100 (to, for example, grab handling lines dangling from the aerostat 102) is not, in general, required. Though a human may be present during autonomous modes.

FIG. 2B is a side-view schematic of the assembly 100 of FIG. 1 in a third state of operation. In FIG. 2B, the aerostat 102 is at a flying altitude, i.e., the aerostat 102 is above the minimum flying altitude 200.

In FIGS. 2A and 2B a nonzero wind condition is depicted, with the aerostat 102 displaced downwind with respect to the ground station 104; in a zero wind condition, the aerostat 102 would fly directly above the ground station 104.

Figure 3:
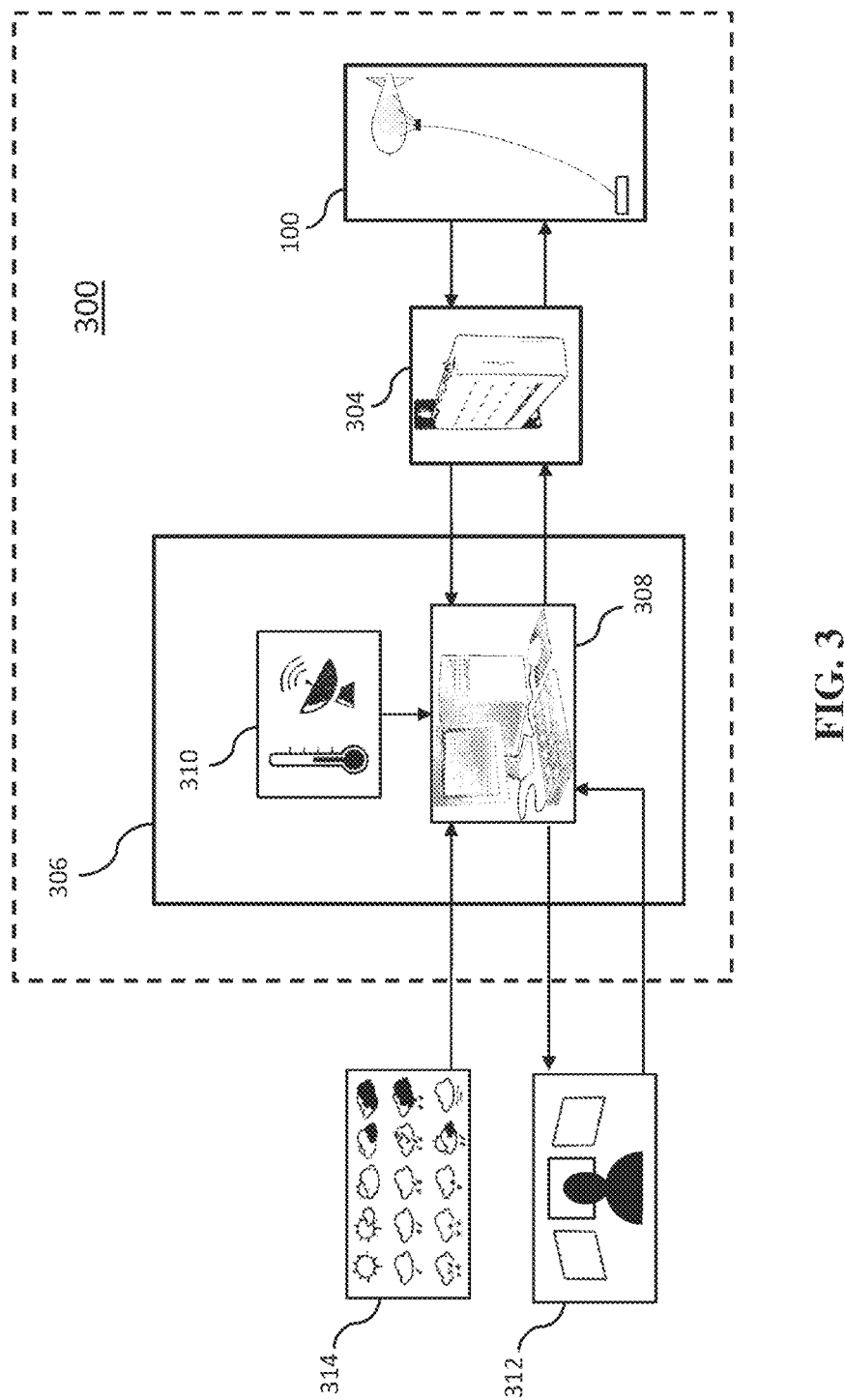
FIG. 3 is a schematic diagram depicting portions of an illustrative autonomous aerostat system.

FIG. 3 is a schematic diagram depicting some components of an automated aerostat system 300 according to an illustrative embodiment of the invention. The system 300 comprises an aerostat system 100 (aerostat, ground station, tethers, sensors, actuators, and other components), an aerostat Flight Controller 304 which exchanges data (e.g., commands, telemetry) with the aerostat system 100, and an Automated Dispatch System 306. All information exchanges between components depicted in FIG. 3 and in other figures herein may take place in a wired manner, a wireless manner, or both: e.g., communications between the Flight System 306 and the aerostat system 100 may take place via a fiber-optic cable, or via a low-power radio link, or by other means. All information exchanges between components depicted in FIG. 3, whether wired or wireless, direct or networked, may be encrypted and otherwise secured (e.g., with passwords for command users) to protect system security. Moreover, all computational capabilities depicted in FIG. 3 and other figures herein may be entirely on-site with the aerostat system 100, entirely off-site, partially both, partially in the Cloud or other distributed computing system, and/or in a customer or other operating center. The unit's computational capacity depicted in FIG. 3 and elsewhere herein are illustrative, not restrictive.

The aerostat Flight Controller 304 directly receives data from sensors on board the aerostat system 100 and directly transmits operational commands to actuators on board the aerostat system 100. The Flight Controller 304 may be located on board the aerostat or the ground platform, or its functions may be divided between hardware units located on both the aerostat and ground platform.

The Automated Dispatch System 306 comprises a device having a programmable computational capability, the Dispatch Controller 308. The Dispatch Controller 308 may also receive data inputs from dedicated environmental sensors 310 comprised by the Dispatch System 306. The Dispatch Controller 308 will be understood to include memory, communications, machine-human-interface, and other capabilities (not depicted) as well as a computational capability. The environmental sensors 310 are co-located with the aerostat system 100 (e.g., as a component of the ground station). Some portions of the Dispatch Controller 308 (e.g., data store, devices enabling communication with the Flight Controller 304) may also be co-located with the aerostat system 100. The computational capability of the Dispatch Controller 308 may be co-located, remotely located, or partially both. A co-located computational capability may be backed up by a remote capability in case of failure. The environmental sensors 310 may be of any type, as for example LIDAR or RADAR for sensing of wind speeds, airborne debris, and approaching airborne vehicles or birds; thermometers; cameras; anemometers; ground intruder detectors; and other.

The Dispatch System 306 may comprise one or more human-machine or machine-machine interface elements. An interface element may be on-site with the aerostat system 100, or remotely located (e.g., communicating with the Dispatch System 306 via the Internet), or both. Where more than one interface is implemented, a predetermined hierarchy excludes simultaneous control by more than one user in some embodiments. An on-site, password-protected human-machine interface provides control override capability in some embodiments.

The Dispatch System 306 may also interface with external entities or organizations, e.g., entity 312. An appropriate interface protocol (e.g., TCP-IP or UDP) may be employed for communications between the Dispatch Controller 308 and an external entity 312 such as a customer operating center.

An appropriate interface protocol (e.g., OPC, OPC-UA, or Profibus) may be used for communications between the Dispatch Controller 308 and the Flight Controller 304. Manufacturer-specific or other protocols, including real-time communications protocols, may be used for communication of data and commands between the aerostat Flight Controller 304 and the various actuators and sensors comprised by the aerostat system 100 with which the Flight Controller 304 is in communication.

The automated aerostat system 300 performs storage of sensor data, flight telemetry, system state changes, commands issued, alarms and faults, and other system states in some embodiments. Such data storage may be implemented both by an on-site memory capacity (e.g., a capacity of the Dispatch Controller 308) and by an off-site memory capacity (e.g., a memory capacity which the aerostat system 300 is in communication via the Internet). By these means, system records are likely to preserved even when the system's network connection is down or in the event that the memory capacity of the Dispatch Controller 308 fails.

The Dispatch Controller 308 can receive inputs from any number of external sources, e.g., a weather forecast source 314. Other possible inputs include specifications of aerostat operational parameters (e.g., priority parameters specifying the value of system availability vs. system safety) originating from one or more external organizations 312 such as a customer operating center, municipal or government agency (e.g., FAA), manufacturer's operating center, or other. Such inputs will inform operational decisions made by a decision capability of the dispatch system 306. The Dispatch Controller 308 also receives aerostat system feedback and status and sensor data from the aerostat Flight Controller 304 in some embodiments.

The Dispatch Controller 308 can transmit outputs to any number of external receivers, e.g., one or more external organizations or the aerostat Flight Controller 304. Data transmitted to external organizations can include summary status feedback on the aerostat system 300 and/or detailed telemetry, system state, or sensor data, stored or real-time. Data transmitted to the aerostat Flight Controller 304 can include commands such as "launch" and "land" and set points such as an altitude set point.

Figure 4:
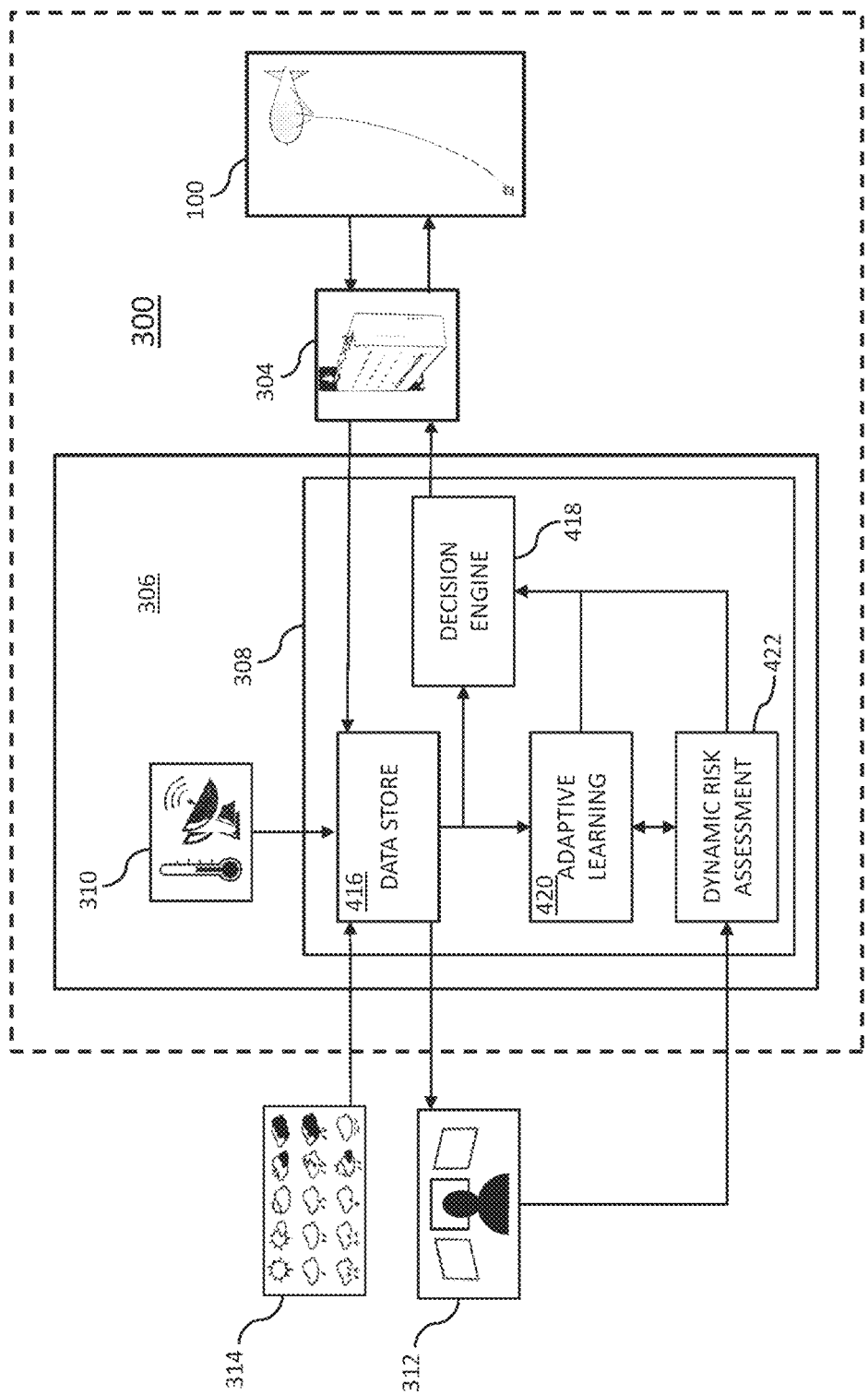
FIG. 4 is a schematic diagram depicting the aerostat system of FIG. 3 in greater detail.

FIG. 4 is a schematic depiction of portions of the illustrative system 300 of FIG. 3 detailing internal portions of the Dispatch Controller 308 according to an embodiment of the invention. In particular, in the illustrative embodiment of FIG. 3 and FIG. 4, several subsystems of the computational capability of the Dispatch Controller 308 are depicted. These subsystems include a Data Store 416, a Decision Engine 418, an Adaptive Learning Unit 420, and a Dynamic Risk Assessment Unit 422. In various embodiments, these subsystems, as well as additional subsystems (e.g., an operating system) not depicted in FIG. 3, may be implemented as separate hardware units, or as units of software functionality in a single computational device, or in multiple computational devices (e.g., both on-site and in the Cloud), or in some combination of these manners. In the illustrative embodiment of FIG. 4, the Data Store 416 is a distinctive device (e.g., hard drive) comprised by the Dispatch Controller 308, and the Decision Engine 418, Adaptive Learning Unit 420, and Dynamic Risk Assessment Unit 422 are implemented as bodies of instruction code stored in the Data Store 416 and executed by a processor comprised by the Dispatch Controller 308.

In the illustrative embodiment of FIG. 4, the Dispatch Controller 308 implements methods of an automated dispatch system. These methods include the code by which the functional subunits Decision Engine 418, Adaptive Learning Unit 420, and Dynamic Risk Assessment 422 are implemented. The Data Store 416 facilitates communication with external interfaces of the Dispatch Controller 308 and between the functional subunits. In schematic representations of various other embodiments, the functional subunits and flows of command and data indicated by arrows in FIG. 4 may differ in number and arrangement while accomplishing tasks essentially similar to those described herein, as well be readily apparent to persons familiar with computer design and control systems.

The functions ascribed hereinbelow to the functional subunits of the Dispatch Controller 308 can in various embodiments be realized in software and executed on hardware according to methods well known to persons familiar with computer science and systems control theory.

Reference is now made to the functionality of the Decision Engine 418 of FIG. 4. As will be clear to persons familiar with computer science, the functionalities about to be described for the Decision Engine 418 and other functional subunits can be implemented using tools (e.g., programming languages, hardware) readily available from existing sources, although not hitherto employed by aerostat control systems, to enable the advantages described herein.

The Decision Engine 418 may make use of weather forecast data, sensor and telemetric data from the aerostat system, site geographical data, default or user-specified operational targets and parameters, and potentially other inputs to calculate optimal set points (e.g. altitude or attitude) to which to command the aerostat and to otherwise command the aerostat and its payload (not depicted). The Decision Engine 418 includes software and hardware for formatting and transmitting the chosen set points and other commands to the aerostat Flight Controller 304 and the aerostat payload. Illustrative commands that may be issued by the decision engine to the aerostat and its payload are commands to change aerostat altitude and/or attitude, commands to land or launch the aerostat, commands to turn capabilities of the payload on and off, commands to change the orientation of the payload, and the like. In an example, if the payload of the autonomous airborne platform is agriculture monitoring equipment, then the Decision Engine 418 calculates, with help from external inputs (e.g., user commands specifying what areas of a farm or field to be monitored), the preferred orientation of the agriculture monitoring equipment (which may differ from the orientation of the aerostat). In another example, if the payload is telecommunication equipment, then the Decision Engine 418 may know the regions of greater population or customer density and use that information to inform the decision of output commands and set points.

The Decision Engine 418 may also make use of weather-forecast data and dedicated environmental sensors 310 comprised by the Dispatch Controller 308 to determine when the aerostat should launch or land, or set appropriate altitude, attitude and/or other set points, based on aerostat flight wind limits, docking wind limits, operational considerations, or other preprogrammed terms. There are three primary aspects to the launch-land decision:

1) Response to immediate sensed conditions (weather, aerostat telemetry, user demand inputs, etc.)

2) Response to predicted conditions (weather, user demand, etc.)
3) Tolerable risk level or other inputs from the Dynamic Risk Assessment unit 422 (to be described further below).

The Decision Engine 418 also incorporates an adaptive weighting of the relative importance of a possible response to immediate conditions and a possible response to predicted conditions, and weighs or averages those responses accordingly. This adaptive weighting is calculated by the Adaptive Learning Unit 420, to be described further below.

The Decision Engine 418 may be constructed to incorporate the concept of flight envelopes. Herein, a "flight envelope" is defined as a surface in an N-dimensional flight space (N≥1) whose N dimensions are physical, environmental, and/or control variables pertinent to the flight behavior of an aerostat. With a subregion of the flight space bounded by one or more flight envelopes, the flight behavior of the aerostat has a certain most-probable character, as for example the character of passive stable flight, of stable flight achievable with active control, of unstable flight with or without active control, or of flight failure. A flight envelope may in part or whole be a region of gradation rather than an abrupt edge or surface; also, flight envelopes may have various topologies (e.g., simply connected, multiply connected). Examples of variables that can define a flight space include wind angle of attack, wind sideslip, wind variability, average wind speed, wind elevation angle, rate of wind heading change, rate of wind elevation angle change, aerostat attitude (pitch, roll, yaw), aerostat altitude, aerostat location with respect to ground station, tether tension(s), mean tether tension vector, aerostat center of mass with respect to center of buoyancy, aerostat buoyancy, aerostat center of mass with respect to center of pressure, precipitation, lightning proximity, or other variables. As these examples show, variables of a flight space can include both observed, uncontrolled variables such as wind characteristics and settable variables such as aerostat altitude. Other possible variables include aerostat fin angle of attack, aerostat fin anhedral angle, aerostat fin surface area relative to the aerostat body size, control surface settings, and any number of other variables. The number of flight-space dimensions may vary with time, installation, aerostat type, and other conditions.

Figure 5:
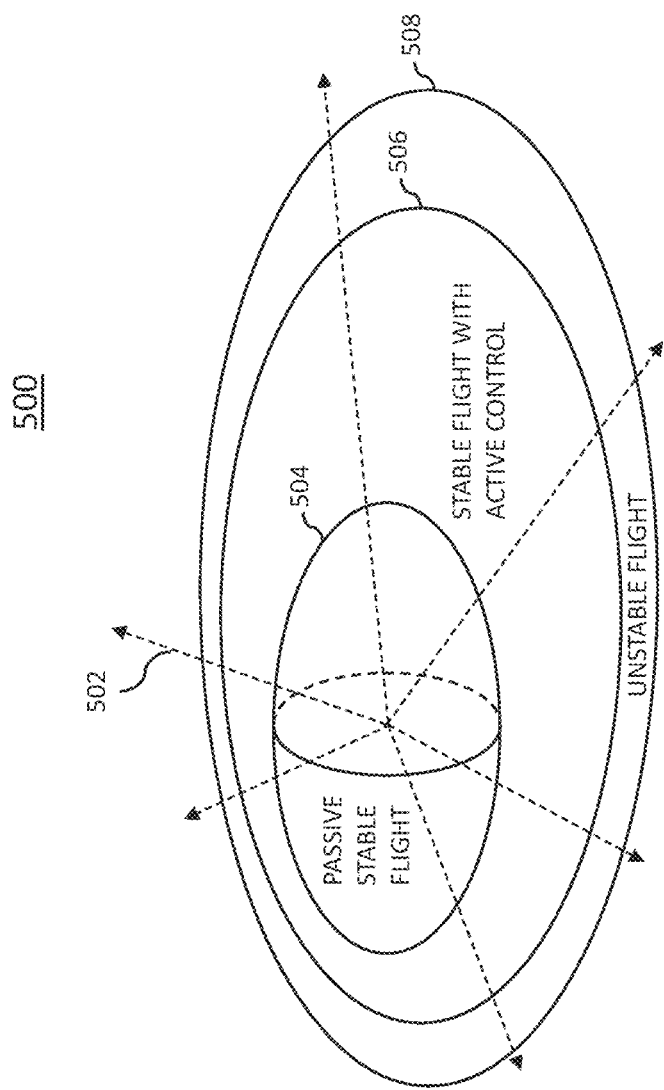
FIG. 5 is a conceptual illustration of nested flight envelopes.

Flight envelopes typically define nested, continuous subregions of the flight space. A conceptual cartoon of nested flight envelopes is shown in FIG. 5. This drawing is illustrative, not a strict depiction of any actual geometry. The flight space 500 of FIG. 5 is defined by N=6 dimensions whereof the 6 axes are depicted as dashed arrows (e.g., axis 502). A first flight envelope 504 bounds an ellipsoid wherein passive stable flight of the aerostat occurs. The first envelope 504 and a second envelope 506 together bound a region wherein stable flight is possible, but only with active control (e.g., of tether lengths and aerostat control surfaces). The second envelope 506 and a third envelope 508 together bound a region wherein flight is unstable, even with active control. Outside the third flight envelope 508, safe flight may not be possible. In other embodiments, more or fewer flight envelopes and corresponding subregions of flight space could be defined.

The Decision Engine 418 of FIG. 4 may be cognizant of the flight envelope structure in N-dimensional flight space for a given aerostat, ground platform, and control system. At any given moment, a given aerostat occupies a single point in the flight space. In an example, if axis 502 is the axis of wind speed, starting at zero wind speed and moving solely along axis 502 will eventually take the aerostat outside the third envelope 508 into the region of no flight: that is, above a certain absolutely velocity, wind will destroy the aerostat system no matter what other conditions prevail. Typically, the goal of the Decision Engine 418 is to maintain the aerostat in flight, which means maintaining the aerostat within the passive-stable region or stable-with-active-control region of the flight space. Exceptions can occur, e.g., if flight failure is highly probable the controller may precipitate a failure mode to limit damage to person or property.

Aerostat flight behavior in any region of the flight space is probabilistic, not certain: thus, some level of risk is associated with every point in the flight space, where "risk" can be conceived as a probability density function over the performance space of the aerostat system (i.e., that space whose dimensions comprise aspects of aerostat condition and behavior, payload condition and behavior, etc.). In an example, the "risk" associated with a certain point in the flight space includes both (a) a relatively high risk of failure to perform a payload task, such as delivering telecommunication signal, and (b) a relatively low probability of damage to the aerostat. (The aerostat is safer, but the job may not get done.) Moreover, risk is typically nonuniform within subregions of the flight space: in an example, within the region of stable flight with active control, risk is higher near the unstable-flight envelope 508 and lower near the passive-stable-flight envelope 504. Risk is also typically nonstationary in the statistical sense, that is, the risk assigned to each point of flight space may vary in response to environmental variables, command inputs, time of day, or other factors.

The Decision Engine 418 of FIG. 4 may be cognizant of the risk or risk distribution assigned to each point in the flight space, however this is assigned. In general, the Decision Engine 418 seeks to achieve user-specified goals or set points (e.g., time aloft, altitude, and the like) while minimizing overall risk. The determination of command outputs by the Decision Engine 418 is shaped by settable weights or functions that parameterize the decision-making algorithm: in an example, deployment of a telecommunications payload may be given a relatively high or low priority compared to non-fatal damage to the aerostat, depending on the criticality of the payload service. Also, the Decision Engine 418 can use the likely time-course of upcoming weather as based on forecasts or internal predictive algorithms, along with information about rates at which the system can in the future progress through the flight envelope (e.g., how long it takes to launch, adjust flight variables, land), in order to determine real-time risk and to inform the command and set point outputs of the automated Dispatch Controller 308. For purposes herein, "real-time risk" refers to a risk which has been determined based on data that is sufficiently current to provide a reasonably reliable estimate of the immediately present state of the data. In some embodiments, all of the wind condition data used in assessing real-time risk may be no more than five seconds old. In some embodiments, all of the wind condition data may be no more than thirty seconds old. In some embodiments, all of the wind condition data may be no more than one minute old. The particular amount of time that has passed for data to still be considered real-time may vary relative to the particular value being measured or received. For example, the buoyancy of the aerostat may vary over time due to air temperature, but twenty minute-old data may be relevant for a real-time risk assessment. Whereas for a wind heading, data may be limited to measurements taken less than five seconds ago. Similarly, a "present measurement" includes measurements which have been taken sufficiently recently to provide a reasonably reliable estimate of the immediately present value of a condition. For purposes herein, determining a risk is meant to include determining an estimated risk, or estimating a risk.

The Decision Engine 418 also may reference settable criteria for setting alarm conditions that are transmitted to one or more control systems and/or human operators in some embodiments, e.g., by text message, alarm sounding, and/or other forms of alerting. The Decision Engine 418 may control one or more aerostats, either co-located or in diverse locations.

Reference is now made to the functionality of the Dynamic Risk Assessment unit 422 of FIG. 4. In one embodiment, the Dynamic Risk Assessment unit 422 sends a value for tolerated risk to the Decision Engine which the Decision Engine 418 may use to determine commands and set points. Here, a "value for tolerated risk" may be a single scalar number or a vector specifying tolerable risk for a number of variables. Moreover, "risk" may comprise estimates of both event probability and event cost, or may be calculated as a function of these. Risk values may be attached to damage to particular aerostat components, damage to particular ground platform components, payload damage, failure to perform payload function, loss of aerostat and/or ground platform, collision with an airborne vehicle, and any other event that may be construed as undesirable by system programmers.

The algorithm employed by the Dynamic Risk Assessment Unit 422 determines and updates tolerable risk values either continuously (e.g., at a rate limited by computational capability) or at fixed intervals, and bases its determinations upon a number of factors. These factors may include the following, as well as others not specified herein:

Input from an external entity (e.g., customer(s) operating center, municipal or governmental agencies) on the importance of having the payload remain in a particular position and orientation at a particular time.

Knowledge of aerostat system maintenance status or predictive maintenance system status (service recently done, service overdue, upcoming service needs, system health status) and its impact on risk on continued flight and mission performance.

Customer desired performance metrics (e.g., up-time, platform stability, platform orientation and altitude).

Knowledge of the system's current (e.g., monthly) up-time status.

In an example, the algorithm employed by the Dynamic Risk Assessment Unit 422 determines the probability and cost of payload up-time loss and of damage if the aerostat remains flying, and communicates these risk assessments to the Decision Engine 418.

The Dynamic Risk Assessment Unit 422 may assess risk for one or more aerostats, either co-located or in diverse locations. Assessed risk may be a system-wide risk as opposed to an agglomerate of individual risks.

Reference is now made to the functionality of the Adaptive Learning Unit 420 of FIG. 4. The Adaptive Learning Unit 420 logs and evaluates historic system aerostat launch, flight, and landing operations and responses under recorded environmental conditions (e.g., temperature, wind). The goal of such evaluation is to adapt operational parameters for launch, flight, and landing to achieve better performance according to defined metrics (e.g., rapidity of response, reduction of risk, expanding stable flight envelope, minimizing power consumption, minimizing transient motion or attitude offsets, etc.). The output of the Adaptive Learning Unit 420 is communicated to both the Dynamic Risk Assessment Unit 422 and the Decision Engine 418 as an input to their own algorithms. In an example, one output of the Adaptive Learning Unit 420 is a set of adjusted flight envelopes. The Adaptive Learning Unit 420 can be implemented using a variety of techniques known to persons familiar with the field of machine learning. In various embodiments the Adaptive Learning Unit 420 is implemented as a neural network, plant model and Kalman filter, or genetic algorithm.

The Adaptive Learning Unit 420 may perform Adaptive Learning for one or more aerostats, either co-located or in diverse locations, and may work in conjunction with other Adaptive Learning Units to leverage a larger pool of historic data.

The system and method of various embodiments comprises an autonomous flight sequence, where "autonomous" signifies a lessened need for human presence at the aerostat operational site and/or for human control intervention either locally or remotely, possibly to include no need for human presence or intervention. The autonomous flight sequence is implemented by the Flight Controller 304 of FIGS. 3 and 4 to enable the advantages of autonomous aerostat operation to be realized. The autonomous flight sequence may comprise a sequence of system modes of operation of the various components of an aerostat system (e.g., the assembly 100 of FIG. 1) which enable the aerostat to transition from a secured state (i.e., aerostat firmly coupled to ground station) to a docked state (i.e., aerostat is in contact with the ground station but not secured thereto) through launching (i.e., aerostat is attached to the ground station only by one or more tethers and is ascending but has not yet achieved the minimum operational flying altitude) to a flying state. From the flying state, the autonomous flight sequence can be reversed to enable the aerostat to transition through the modes of flying, landing (i.e., aerostat is attached to the ground station only by one or more tethers, is descending, and has passed below the minimum operational flying altitude), docked, and secured. In prior art, on-site human presence is mandatory for the accomplishment of these sequences. Modes may comprise sub-modes: in an example, the flying mode has sub-modes of ascent, steady-state flight, and descent.

Each operating mode has a corresponding set of control laws. The control laws define the operation of settable or controllable components of the aerostat system, such as tether winches, aerostat control surfaces, aerostat propulsors, ground station slew systems, and the like. Transitions between the modes and their sub-modes are managed in part by commands from the decision engine (which is informed in part by commands from an external entity), programmed operational set points, inputs from airborne and/or ground-based sensors, and possibly other factors. In an example, a remote operator commands retrieval of the aerostat and the decision engine of the dispatch controller issues a command to dock. The flight controller, upon receiving the command to dock, manages transition through steady-state flying submode, descent submode, landing mode, docking mode, to docked mode. In another example, the decision engine of the dispatch controller detects unacceptably risky weather conditions in a near-term forecast and autonomously manages retrieval of the aerostat by issuing a command to dock; when weather again permits aerostat flight, the decision engine autonomously re-launches the aerostat by issuing a command to launch.

Figure 6:
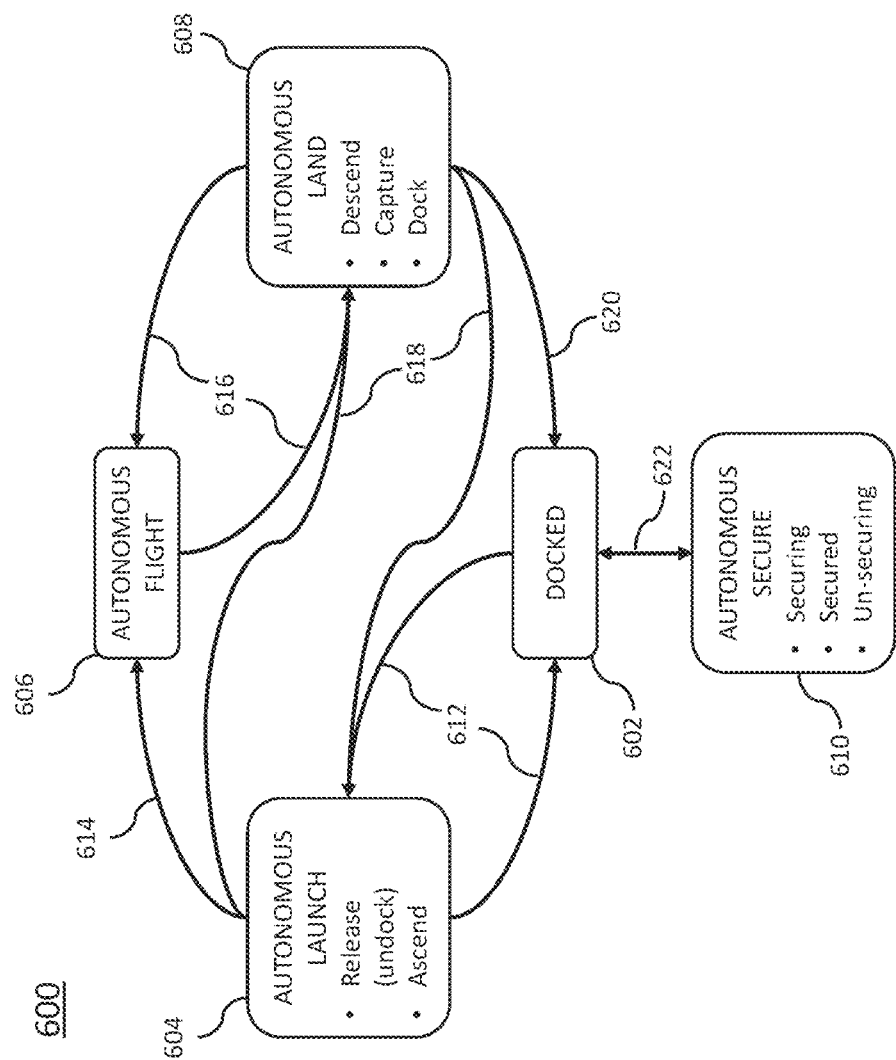
FIG. 6 is a logic diagram depicting modes of an autonomous aerostat flight sequence.

FIG. 6 is a state diagram depicting an illustrative set of operational modes and submodes of an autonomous flight sequence 600 and the transitions between the modes. Five modes are defined, namely (1) Docked 602, (2) Autonomous Launch 604, (3) Autonomous Flight 606, (4) Autonomous Land 608, and (5) Autonomous Secure 610. The number, identity, and transitional relationships of modes comprised by an autonomous flight sequence may differ in various embodiments from the modes depicted in FIG. 6. In some embodiments, one, more than one, or all of the modes need not necessarily be fully autonomous or even partially autonomous. For example, in some embodiments, the launch mode may be performed entirely manually while the launch, flight, land, and secure modes may be autonomous.

For purposes herein, the term "mode" denotes a mode of operation which may include inventive methods and control of physical devices. In some embodiments, some or all of the physical devices may be known devices. In some embodiments, new device arrangements may be operationally controlled by the system during a given mode of operation. A "mode" is also referred to as a "process" or equivalent terms herein.

Below, five modes of the autonomous flight sequence 600 are as follows:

1) Docked 602. The nominal starting point for the system is in the Docked position 602. In the Docked position 602, the tether or tethers are pulled all the way in and the aerostat is held in its cradle (which may comprise pads or other supports) by the tethers and potentially by the bridles and other mechanisms, e.g., a nose cone, belts, latches, magnets, or the like. However, the aerostat is not fully secured to the ground station.

2) Autonomous Launch 604. The Autonomous Launch mode 604 comprises two sub-modes, Release (undock) and Ascend, which are described in more detail hereinbelow. During Autonomous Launch 604, the aerostat and its bridle(s) are disengaged from the ground station and the one or more tethers are spooled out, allowing the aerostat to rise to the minimum flying altitude.

3) Autonomous Flight 606. During Autonomous Flight 606, described in more detail hereinbelow, the automated Flight Controller 304 of FIGS. 3 and 4 receives sensor readings and generates commands to actuators of the ground station and/or aerostat in order to substantially achieve the attitude and altitude set-points received from the automated Dispatch Controller 308.

4) Autonomous Land 608. The Autonomous Land mode 608 comprises three sub-modes, Descend, Capture, and Dock, described in more detail hereinbelow. During Autonomous Land 608, the ground station reels in the one or more tethers and/or bridle lines or handling lines, causing the aerostat to descend until positive contact with the ground station is made and the aerostat is pulled into its final position in its cradle.

5) Autonomous Secure 610. The Autonomous Secure mode 610 comprises a sequence of sub-states (Securing, Secured, and Un-securing) that mediate between the Docked state 602 and a fully secured condition. During the Autonomous Secure process 610, which typically makes use of sensors and actuators additional to those used in other modes, the ground station brings the aerostat into a secured state that is resistant to weather conditions more severe than those tolerated while the aerostat is in the normal, docked position and in which the aerostat may, in an some embodiments, be transported. The un-securing process reverses the securing process. The purpose of the secured state is to allow the system to "hunker down" and weather more extreme conditions (e.g. hurricane force winds) and/or transport.

In FIG. 6, transitions between modes are denoted by single- or double-headed arrows. The allowed transitions between the five modes of the autonomous flight sequence 600 are as follows:

1) Transition Between Docked and Autonomous Launch 612. The transition from docked to autonomous launch 612 occurs upon a "launch" command from the automated Dispatch Controller 308 of FIGS. 3 and 4. In some embodiments, the system may transition back from Autonomous Launch 604 to Docked 602 upon an "abort launch" command from the Dispatch Controller 308 if the launch process has not substantially begun.

2) Transitions Between Autonomous Launch and Autonomous Flight 614. The transition 614 from Autonomous Launch 604 to Autonomous Flight 606 occurs upon the aerostat reaching a minimum flying altitude, as determined by the altitude sensors or estimators.

3) Transitions Between Autonomous Flight and Autonomous Land 616. The transition from Autonomous Flight 606 to Autonomous Land 608 occurs upon a "land" command from the automated Dispatch Controller 308. In some embodiments, the system may transition back from Autonomous Land 608 to Autonomous Flight 606 upon an "abort land" command from the automated Dispatch Controller 308 if the land process has not substantially descended the aerostat below the minimum flight altitude.

4) Transitions Between Autonomous Land and Autonomous Launch 618. The transition from Autonomous Land 608 to Autonomous Launch 604 occurs upon an "abort land" command (if the aerostat is substantially below the minimum flying altitude) or a "launch" command from the automated Dispatch Controller 308. The transition from Autonomous Launch 604 to Autonomous Land 608 occurs upon an "abort launch" command (if the launch process has already begun) or upon a "land" command from the automated Dispatch Controller 308.

5) Transitions Between Autonomous Land and Docked 620. The transition [0080] from Autonomous Land 608 to Docked 602 occurs once the Autonomous Land process 608 is complete (as determined by the sensors used during the autonomous land process) and the aerostat is in the final docked position in its cradle.

6) Transitions between Docked and Autonomous Secure 622. The transition from Docked 602 to Autonomous Secure 610 occurs upon a "secure" command from the automated Dispatch Controller 308. Similarly, the transition from Autonomous Secure 610 to Docked 602 occurs upon an "unsecure" command from the automated Dispatch Controller 308.

Figure 7:
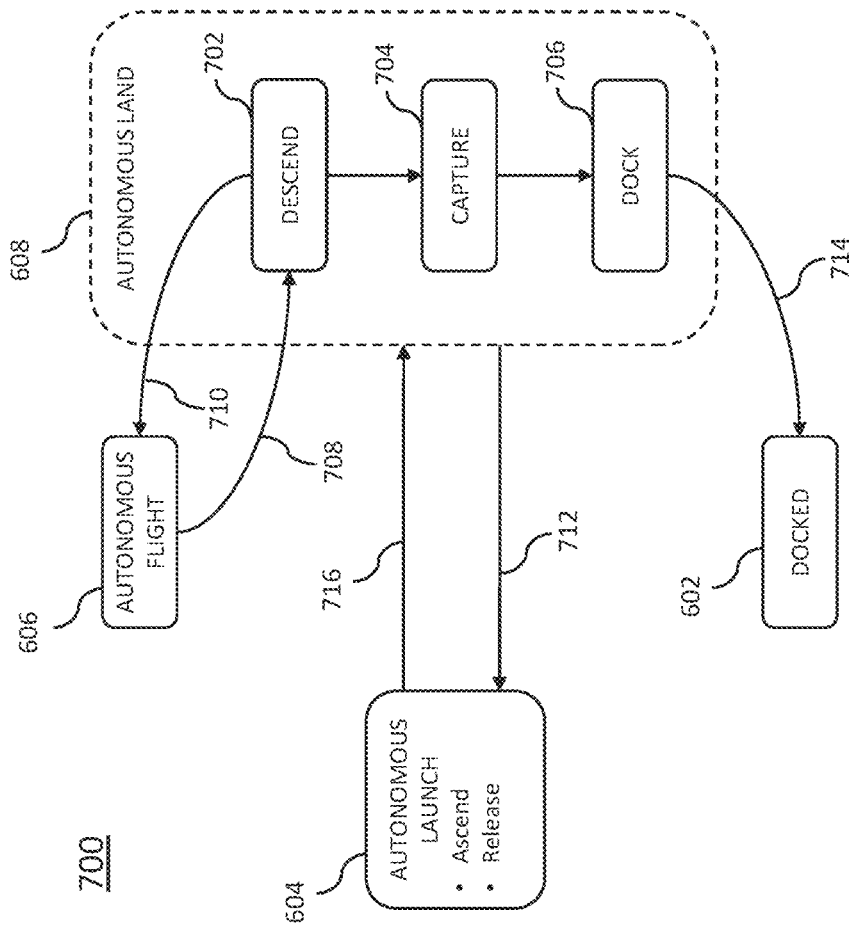
FIG. 7 is a logic diagram depicting modes of an autonomous landing sequence.

Reference is now made to FIG. 7, which further clarifies the Autonomous Land mode 608 of FIG. 6. The submodes of Autonomous Land 608 and transitions between Autonomous Land 608 and the other modes of the illustrative autonomous flight sequence 600 of FIG. 6 are partially depicted in FIG. 7. The Autonomous Land mode 608 comprises autonomous submodes or processes Descend 702, Capture 704, and Dock 706. In other embodiments, additional or different submodes may be included. The autonomous Capture and Dock submodes 704, 706, also referred to herein jointly as "autoland," bring the aerostat down from a flying condition to the ground station and capture it into a docked position without the need for manual intervention (e.g., line handling or issuing of commands by a human operator). In traditional aerostat systems, in contrast, a ground crew of at least several persons is needed to capture handling lines and aid in guiding the aerostat down to the docked position. The crew is similarly needed for launch to control handling lines and aid in releasing the aerostat from the docked position. The need for a large ground crew for docking in traditional systems greatly increases the cost of docking and launching procedures. Moreover, since weather conditions may mandate aerostat landing at any time, a crew must be on call to the aerostat site around the clock to assure system operability. Moreover, delay can be entailed by crew travel to the site. Although launch timing is not as constrained, it is preferable in many applications to have launch capability at any time of day or night: e.g., after a storm passes it is desirable to have a telecommunications capability restored as quickly as possible. Embodiments of the present invention enable an aerostat system that dispenses with the costs, hazards, and delays associated with hands-on human operation. In particular, some embodiments provide the systems and methods necessary to autonomously land, capture, and dock. As mentioned above, the embodiments disclosed herein are described with reference to autonomous modes, but one, some, or all of the modes may not be autonomous in some embodiments. In some embodiments, a given mode may include sub-modes, and one of the sub-modes may be autonomous while another of the sub-modes may be manually controlled.

The Autonomous Land process 608 brings the aerostat from its minimum flying altitude down to its final docked position on the ground station. Descend 702, the first stage of Autonomous Land 608, is triggered by a "land" command from the automated Dispatch Controller 308 of FIG. 3: the transition from Autonomous Flight 606 to Descend 702 is depicted as a first transition 708 in FIG. 7. An "abort land" command or a "launch" command from the automated Dispatch Controller 308 may transition the system back to Autonomous Flight 606, so long as the aerostat has not substantially descended below the minimum flying altitude: the transition from Descend 702 to Autonomous Flight 606 is depicted as a second transition 710 in FIG. 7. If the aerostat is below the minimum flying altitude, or partially captured or docked, an "abort land" command or a "launch" command will transition the system back to Autonomous Launch mode 604: the transition from Autonomous Land 702 to Autonomous Launch 604 is depicted as a third transition 712 in FIG. 7.

During the Descend 702 process, one or more winches or other tether-retracting devices pull the aerostat and its bridles from its starting flight altitude down to a selected altitude threshold or altitude range. For example, in some embodiments, a selected threshold may be 0.5 meters. In some embodiments, the altitude range may be between 0.1 meters and ten meters. Any other suitable threshold or altitude range may be used. During Descend 702, the aerostat Flight Controller 304 of FIG. 3 performs a sequence of maneuvers to control aerostat attitude and prevent undesired behavior as the aerostat is decreasing altitude. An example of an undesired behavior due to decreased tether length is increased angular oscillation, caused essentially by conservation of angular momentum as moment arm is decreased.

The system transitions from Descend 702 to Capture 704 based at least in part upon aerostat altitude, with this transition occurring when the aerostat and its bridles are at a predetermined distance above the ground station. Capture begins with the aerostat at the aforementioned predetermined distance above the ground station. During the capture process, the ground station makes initial, verified physical contact with the aerostat and/or its bridles and then begins the process of pulling the aerostat down into its cradle (which may include holding pads, nose cone, etc.). Pulldown into the cradle continues until the aerostat proper makes first contact with the cradle. Specific actuators may be used as part of the capture process (e.g., mobile guide arms).

The system transitions from Capture 704 to Dock 706 upon initial physical contact of the aerostat with the cradle. Initial contact is detected by sensors whose data may include, for example, tether tension estimates, forces on cradle components, and laser position measurements. During Dock 706, the ground station pulls the aerostat down from an initial cradle contact position to a final cradle contact position. This may include relatively small release and pull-in motions of tether(s) in order to allow the aerostat to shift on or within the cradle. Final docking of the aerostat typically involves the positive closure of latches or other mechanisms that maximally constrain aerostat movement with respect to the ground station.

Throughout Autonomous Land 608, operational tasks that are handled by the Flight Controller 304 of FIG. 3 include but are not limited to determination of contact status, command of various adjustive maneuvers during docking, evaluation of response to such commands, some decisions to transition between modes, and confirmation of mode transitions.

The system transitions from Dock process 706 to Docked mode 602 upon positive indication of docked configuration, that is, secured (e.g., latched) positioning of the aerostat in the cradle as opposed to mere touch contact: the transition from Dock 706 to Docked 602 is depicted as a fourth transition 714 in FIG. 7. Such positive indication of docked status may be had via tether tension measurements, aerostat to cradle contact force measurements, laser position indicators, electrical contacts, or other means.

The system may transition from Autonomous Launch 604 to Autonomous Land 608 upon receiving an "abort launch" command or "land" command from the automated Dispatch Controller 308 of FIG. 3: the transition from Autonomous Launch 604 to Autonomous Land 608 is depicted as a fifth transition 716 in FIG. 7. In this case, the aerostat Flight Controller 304 will determine the sub-mode of automated land (descend, capture, dock) into which the system transitions based upon previous automated launch sub-mode, current docking actuator positions, and sensor readings. The latter may include cradle force sensors, tether tensions, laser position sensors, aerostat altitude sensing or estimation, or other means.

Figure 8A:
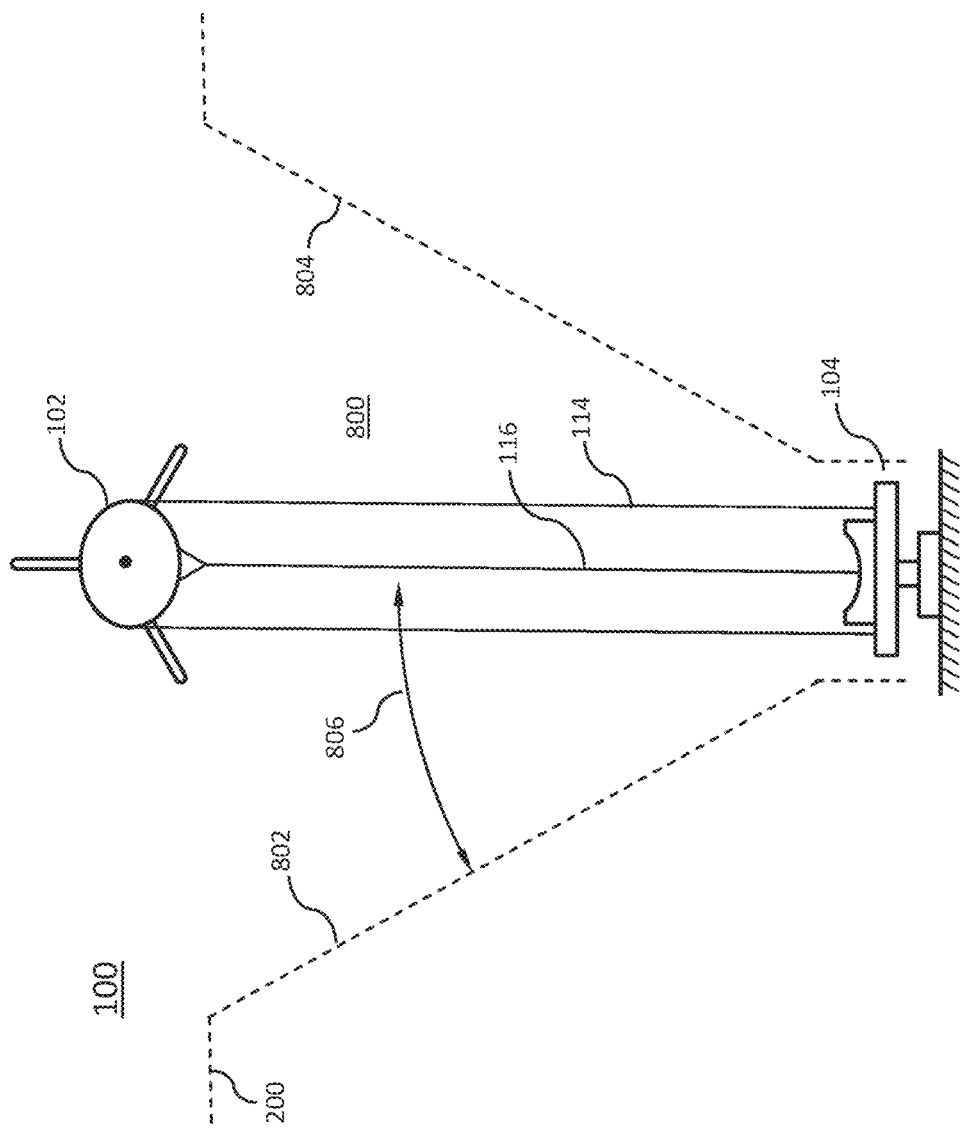

FIG. 8A is a schematic depicting an aspect of a method of control comprised by various embodiments that enables autonomous landing of an aerostat. In FIG. 8A, this aspect of control method is clarified with reference to the illustrative assembly 100 of FIG. 1. A volume of space 800 having approximately the shape of an inverted cone is centered over the ground station 104. This conoid volume is herein termed the "cone of comfort" 800 and is indicated in frontal vertical cross-section by dashed lines 802, 804. The upper end of the cone of comfort 800 terminates at the minimum flying altitude 200 and the lower end terminates approximately at the level of the ground station 104. In the state of operation of assembly 100 depicted in FIG. 8A, the aerostat 102 floats in a stationary manner directly above the ground station 104. In various embodiments, the angular extent of cone of comfort in any vertical cross-sectional plane is defined by a cone-of-comfort angle θ 806. In general, the cone-of-comfort angle θ 806 varies with orientation, that is, with respect to a horizontal angle of rotation φ, and is thus definable as a function θ(φ). Typically, the cone of comfort will have an approximately elliptical cross-section, be symmetrical with respect to a plane aligned with the ground station 104 and aligned therewith (i.e., a plane perpendicular to the plane of FIG. 8A and passing through the center of the ground station 104), and be asymmetrical with respect to other planes. For example, the cone of comfort 800 will typically extend equally to left and right of the ground station 104 (in the view of FIG. 8a) but extend further downwind than upwind at any given altitude.

The foregoing description of an illustrative cone of comfort 800 assumes that the conoid volume is bounded by a ruled surface (i.e., a surface that can be generated by translating and rotating a straight line). In various embodiments, however, the conoid is bounded in a more complex manner, e.g., a manner determined by features of the specific mechanical character of the assembly 100 (e.g., aerostat flying properties, locations of tethers) and/or by dynamic factors such as wind gustiness. In general, the bounds of the cone of comfort 800 are known and/or dynamically calculated by the Flight Controller 304 of FIG. 3. In brief, the operational goal of the Flight Controller 304 is to maintain the position of the aerostat 102 within the cone of comfort at all times during a descent or launch process. Straying outside the cone of comfort 800 entails a level of risk that has been deemed unacceptable (e.g., by a human operator or designer or by software executed by the Dispatch Controller 308 of FIG. 1); the bounding surface of the cone of comfort 800 is, then, determined by a combination of system mechanical properties and acceptable risk. Risk is acceptable inside the cone, unacceptable outside.

FIG. 8B schematically depicts an illustrative trajectory of the aerostat 102 during a Descend process 702 such as that described with reference to FIG. 7. In the depicted case, the aerostat 102 is presumed to begin its descent from above the minimum flying altitude 200 and to possess some initial oscillatory motion, or to have an oscillatory motion imparted by wind forces during descent, or both. In the descent depicted in FIG. 8B, the path 808, although oscillatory, is such as to keep the position of the aerostat 102 within the cone of comfort 800. Here, aerostat "position" is defined as the location of the center of gravity of the aerostat 102: in various other embodiments, position may be defined otherwise, e.g., as the extent of the main body of the aerostat 102, or of its fins.

Figure 8C:
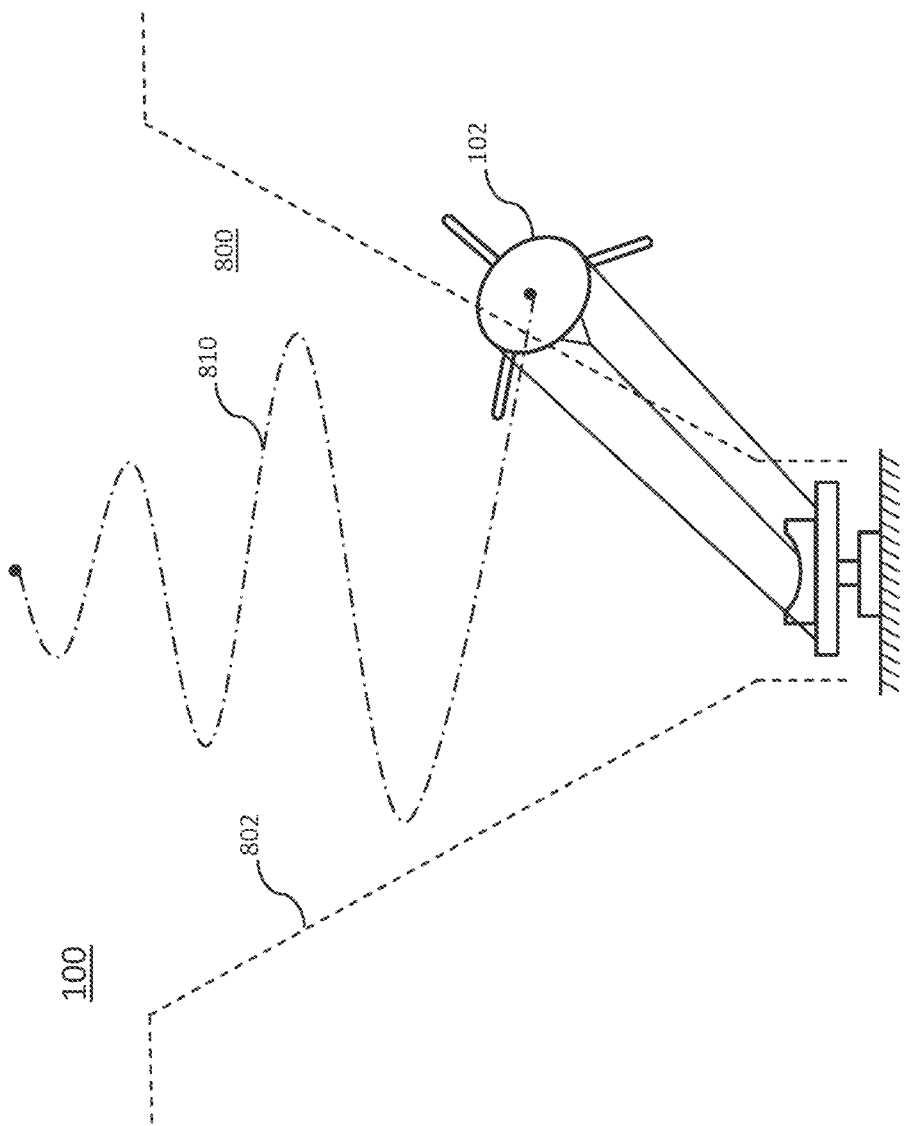

By the conservation of angular momentum, in the absence of sufficient damping, the amplitude of a pendulum's swing increases if the pendulum's length is progressively shortened; similarly, the tendency of an aerostat 102 having oscillatory motion is for the oscillations to increase as the aerostat is drawn down. This tendency is depicted in FIG. 8C, where an illustrative descent trajectory 810 features increasing oscillations that, at least one time, place the aerostat 102 outside the cone of comfort 800. By definition, excursion of the aerostat 102 outside the cone of comfort 800 raises risk (e.g., of aerostat damage) to an unacceptable level. In response to the detection of such a condition, the Flight Controller 304 of FIG. 1 can make one or more responses. A first possible response is to pause drawdown of the aerostat 102 and allow the oscillations to damp spontaneously to an acceptable magnitude. A second possible response is to pay out the tethers in a manner that increases aerostat altitude and, by conservation of angular momentum, decreases oscillation magnitude. A third possible response is to differentially pay out and reel in tethers in a manner that damps the oscillations. A fourth possible response is to activate propulsors or control surfaces on the aerostat in a manner that damps the oscillation. Any two or more of these responses may be made simultaneously. Other suitable responses or combinations of responses may be made as this list is not intended to be comprehensive.

Unacceptable motions or oscillations of the aerostat 102, i.e. motions that take it outside the cone of comfort 800, may occur not only as a result of the increasing-oscillations process depicted in FIG. 8C, but as a result of wind gusts impinging on the aerostat 102 during descent. In general, the goal of the Flight Controller 304 is to first restore the aerostat to a flight condition having acceptably low risk, and then to proceed with whatever procedure had been previously commanded by the Dispatch Controller 308 of FIG. 3, e.g., launching or landing.

Figure 9:
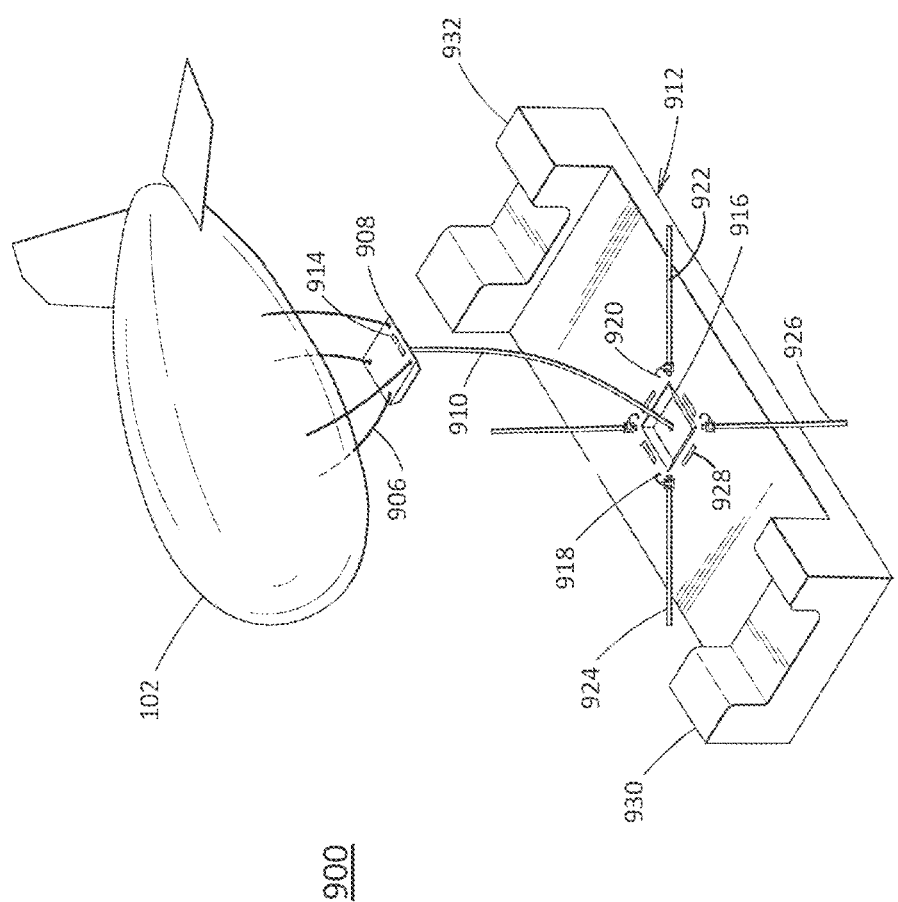
FIG. 9 is a schematic depiction of a landing-and-capture system for a single-tether aerostat.

FIG. 9 schematically depicts portions of an automated docking system for an aerostat system 900 according to an illustrative embodiment in which an aerostat 102 is anchored by a single primary tether 910 and a bridle. Herein, the term "bridle" refers to a group of two or more cables or lines ("bridle lines"), e.g., bridle line 906, each of which is attached at one end to the aerostat 102 and at the other to a bridle block 908. Bridle line 906 may also include split or branching lines, in which a bridle line may connect to a group of two or more lines, each of which may be attached to further branching bridle lines or to the aerostat, and so on. Typically, the bridle lines converge from points of attachment on the aerostat 102 to the bridle block 908. From the bottom of the bridle block 908 a single or primary tether runs to the ground station. In a typical single-primary-tether aerostat system, M bridle lines converge to a bridle block 908 and a single tether 910 leads from the bridle block 908 to the ground station 912, where the tether 910 is payed out or reeled in by a winch or other mechanism (not depicted in FIG. 9).

The bridle-capture system of the illustrative embodiment of FIG. 9 comprises two complementary subsystems: (1) a bridle block 908 comprising one or more sensor-detectable orientation tags (e.g., tag 914) and other features to be described hereinbelow; and (2) a ground-station capture system comprising a bridle catch port 916, bridle-line capturer (e.g., hooks 918, 920), bridle-line actuators (e.g., rails 922, 924, 926), orientation-tag sensors (e.g., sensor 928), and cradles 930, 932. The components and operation of one embodiment of a bridle-capture system comprised by assembly 900 will be clarified in following figures. Other bridle-line capturers may include snatch blocks, articulated rollers, actuated or passive pinch rollers, capstans, spools, windlasses, bobbins, or other suitable capturer.

In FIG. 9, the aerostat 102 is depicted as being partway through an automated launch or landing process; that is, the aerostat is below the minimum flying altitude and is relatively close to the ground station 912. Specifically for the Autonomous Land process 608 of FIG. 7, FIG. 9 depicts the Aerostat 102 as substantially through the Descend process 702 of FIG. 7 and nearing the transition to Capture 704.

Figure 10:
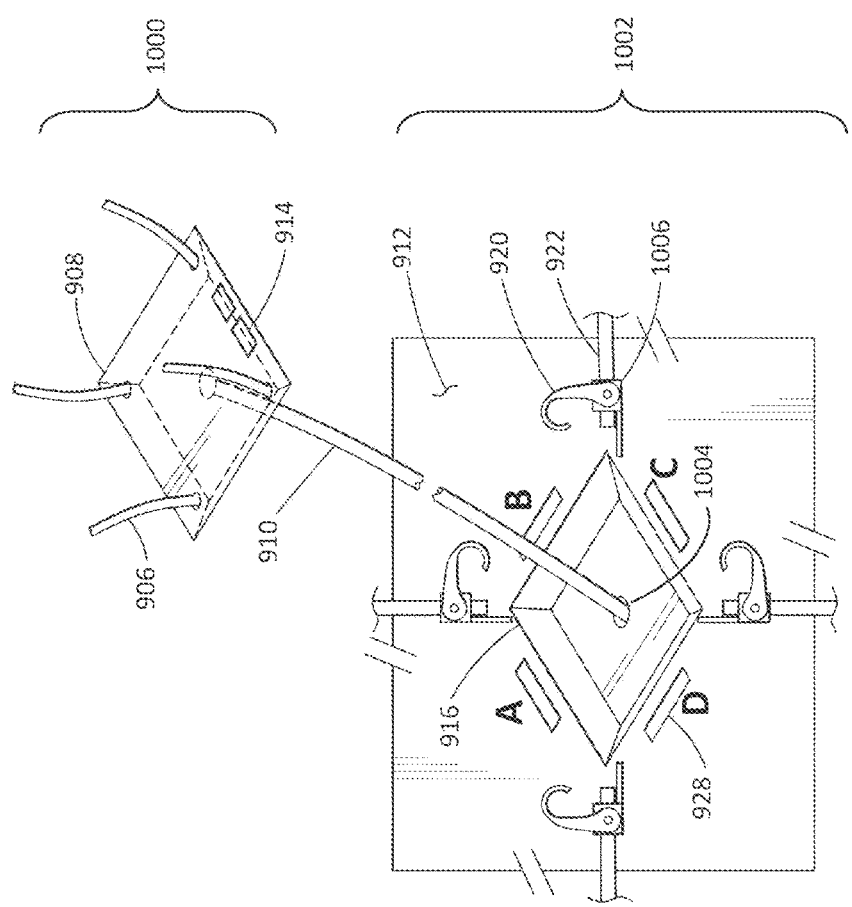
FIG. 10 is a schematic depiction in more detail of portions of the land-and-capture mechanism of FIG. 9 for a single-tether aerostat.

FIG. 10 depicts the two complementary subsystems of the bridle-capture system of FIG. 9 in more detail:

1) Bridle block subsystem 1000: In the illustrative embodiment, the bridle block 908 is structured as follows: Four bridle lines (e.g., line 906) converge from the aerostat to the bridle block 908. The bridle catch block 908 has a characteristic, nonisotropic shape which in this embodiment approximates an inverted, truncated, square pyramid. The four bridle lines are attached to the four corners of the upper surface of the bridle block 908. The primary tether 910 is attached to the center of the base of the block 908. The block 908 also comprises one or more distinguishable, sensor-detectable components (e.g., near-field communications tags, magnets of specific orientations), e.g., tag 914, with one or more such tags located near one or more edges of the bridle block 908.

2) Block capture subsystem 1002: A bridle catch port 916 comprises a concavity or receptacle whose shape is complementary to the anisotropic shape of the bridle block 908; that is, the bridle block 908 fits the catch port 916 in a lock-and-key manner. Because of the anisotropic shapes of the block 908 and port 916, the block 908 can fit into the port 916 only in a limited number of orientations: e.g., a symmetric four-sided truncated pyramid can be fully fitted into a four-sided pyramidal receiver in only four orientations. In some embodiments, the bridle block and the port may be arranged such that only one relative orientation results in a fit. Further, in some embodiments, the bridle block may not have discrete faces, but instead have a smooth surface without edges. For example, the bridle block may be shaped as an approximate ellipse with one or more irregular bumps along an outside wall such that the block fits into a complementary port in only one possible orientation. The ground-station capture system may also comprise a plurality of sensors (e.g., sensor 928), arranged around the perimeter of the catch port 916. The plurality of sensors (e.g., A, B, C, and D) are capable of sensing or identifying the proximity of the orientation tag 914 and of producing an electronic output signal that reports which sensor the tag 914 is most proximate to when the block 908 is fitted into the catch port 916. Thus, for example, upon block fitting, sensor A may report that the tag 914 is proximate. The sensor reports will uniquely determine which of the finite number of fitted orientations the block 908 has assumed. In various other embodiments, other numbers of sensors and/or tags are employed and/or other mechanisms (e.g., electrical contacts, an overall magnetic field of the block 908) are employed to detect the orientation of the snugged bridle block 908 with respect to the catch port 916. The primary tether 910 is threaded through an eye or port 1004 or otherwise attached at the nethermost point of the catch port and is conducted thence to a winch or other mechanism (not depicted) capable of reeling in and paying out the tether 910. The block capture system 1002 may also comprise a plurality of bridle spreaders, each of which is configured to capture and actuate one or more bridle lines. In one embodiment, an exemplary bridle spreader may take the form of openable and closeable hook assemblies, each bridle spreader comprising a hinged hook (e.g., hook 920) and a hook base 1006. Other exemplary bridle spreaders may take the form of snatch blocks, articulated rollers, actuated or passive pinch rollers, capstans, spools, windlasses, bobbins, or any other suitable mechanism or combination of mechanisms suitable for the capture and actuation of bridle lines. Each of these mechanisms may further comprise various sensors to measure and ensure the successful capture of bridle lines. The capture mechanism may also comprise a plurality of bridle spreader translators configured to induce translational motion to the bridle spreader and associated captured bridle lines. In one embodiment, an exemplary bridle spreader translator may take the form of one or more rails (e.g., rail 922) that radiate from points near the perimeter of the catch port 916. In some embodiments, the rails may radiate from the port 916 opening in the plane of the port opening or at some declivity with respect to the plane of the port opening. The rails (or other suitable actuator) may be oriented and positioned in any suitable manner and are not limited to radiating from the port. In some embodiments, the orientation and/or position of one or more rails may be actively changed during operation. In some embodiments, a controller may control the orientation and/or position of one or more rails. In one embodiment, each hook base 1006 moves along its associated rail 922 and each hook 920 is controllably driven to positions along the rail 922. In other embodiments, the bridle spreader translator may take the form of a twing, barber hauler, or any other mechanism or combination of mechanisms suitable for the translation of the bridle spreader distally from the capture block. Various mechanisms well-known to mechanical engineers (e.g., pulley-and-cable mechanisms, screws, linear actuators, motors, etc.) can be used to actuate bridle spreader assemblies and bridle spreader translators in any number of manners to achieve their intended purpose. In brief, the function of the bridle block and catch port are to align the bridles into known positions and the function of the combination of bridle spreaders and bridle spreader translators is to capture the bridle lines and actuate the bridle lines so as to draw down the aerostat in a controllable fashion.

It should be appreciated that the aforementioned mechanisms may be utilized to actuate one or more bridle lines, and that it may not be necessary for all bridle lines to be so actuated in order to achieve the objective of docking or otherwise controlling an aerostat. It should be further appreciated that in some embodiments, one, several, or all of the bridle lines may be detached from the bridle block upon capture by the bridle spreader, and may be, prior to or following detachment from the bridle block, attached to a portion of the bridle spreader.

In the illustrated embodiment, the positioning of hook assemblies along their rails, as well as hook closure and opening, are controlled by the Flight Controller 304 of FIG. 3. Data from the sensors (e.g., A, B, C, and D) as well as from various other sensors comprised by the ground station 912 are reported to the Flight Controller 304. As discussed above, other bridle spreaders and bridle actuators may be used.

Figure 11:
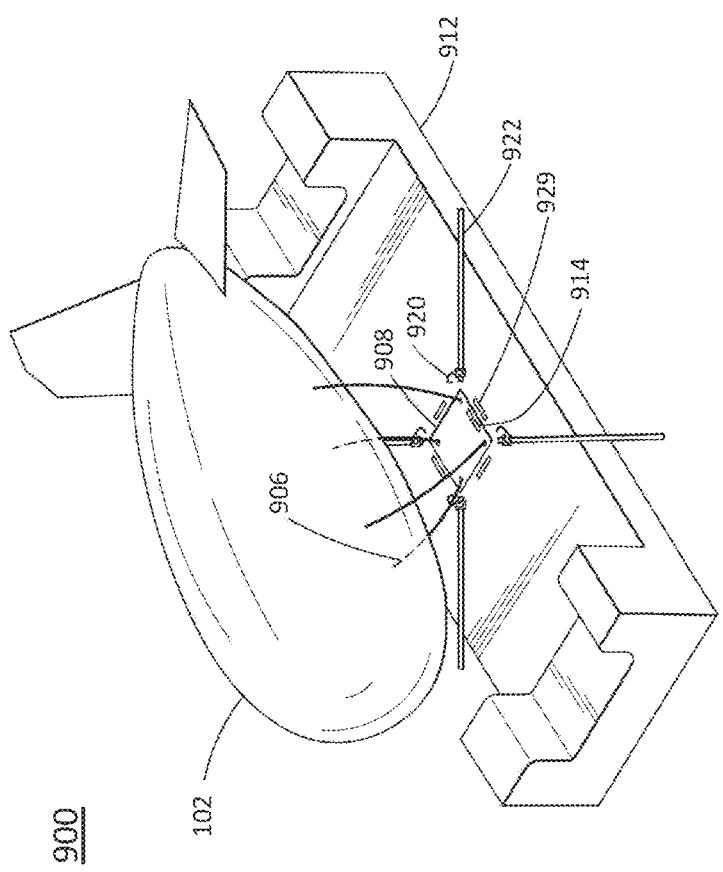
FIG. 11 is a schematic depiction of the landing-and-capture system of FIG. 9 in a different state of operation.

FIG. 11 depicts the illustrative system 900 of FIG. 9 in a second state of operation that occurs during an automated landing process, specifically at the end of the capture process 704 of FIG. 7. In the state of operation of FIG. 11, the block 908 has been drawn down fully into the catch port by retracting the primary tether (port and tether not depicted in FIG. 11) through the port eye 1004 of FIG. 10. The bridle lines (e.g., line 906) have not been drawn down, so the aerostat 102 hovers some distance above the ground station 912. The orientation tag 914 has aligned with a sensor 928 (in this case, sensor B of FIG. 10). The four bridle spreader hooks (e.g., hook 920) have been positioned on their respective rails (e.g., rail 922) proximately to the block 908.

Figure 12B:
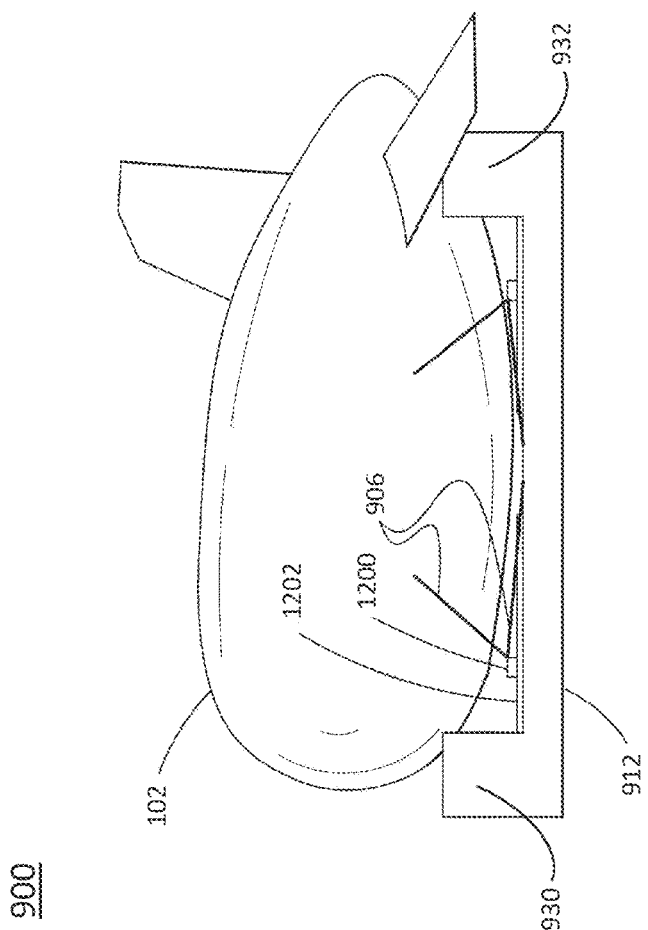

FIGS. 12A and 12B clarify the dock process 706 of FIG. 7 whereby the aerostat 102 is drawn down from the position of FIG. 11 into contact with the ground station 912. FIG. 12A depicts in side view portions of the system 900 in the state of operation already shown in FIG. 11. A hook assembly 1200 is shown in proximate position on its rail 1202. Bridle lines (e.g., line 906) diverge upward from the corners of the bridle block, which is fitted into the catch port (block and port not depicted in FIG. 12A). FIG. 12B depicts the system 900 in a state where the bridle lines have been captured by the hook assemblies and the hook assemblies have retracted to drawn down the aerostat 102. That is, hook assembly 1200 has captured bridle line 906 and retracted along rail 1202 from the proximate position of FIG. 12A to a distal position. An aerostat Flight Controller 304 of FIG. 3 may independently control the rate that each bridle line is retracted so as to control the altitude and attitude (e.g., pitch and roll angles) of the aerostat during the retraction process.

The aerostat 102 has been drawn down into contact with the fore and aft cradles 930, 932. As the hook assemblies further retract along their rails and pull the aerostat 102 firmly down into cradles 930, 932, force sensors within cradles 930, 932 transmit force data to Flight Controller 304 of FIG. 3, which transitions the system from Dock 706 of FIG. 7 to Docked 602 upon detection of sufficient contact between the aerostat and the cradles.

A typical sequence of operational states of the illustrative system 900 of FIG. 9 during an automated landing process is as follows:

1) The four hooks of the block-capture subsystem are at distal positions on their respective rails.
2) The primary tether is reeled in through the eye of the catch port until the catch block is immediately above (e.g. 0.5 m) the catch port (descend process 702 of FIG. 7)
3) The primary tether is reeled in through the eye of the catch port until the catch block fits into the catch port (capture process 704 of FIG. 7) and has registered in the correct orientation.
4) When correctly oriented block-in-port fit is determined by the Flight Controller 304 of FIG. 3 based on sensor reports of orientation tag proximity (beginning of Dock 706 of FIG. 7), the hook assemblies are moved to proximal positions on their respective rails with their hooks in an Open state. This hook arrangement is herein termed Bridle Catching Position.
5) The four hooks close on the four bridle lines. The hooks are sized, positioned, and hinged so that when they are in Bridle Catching Position and go from Open to Closed each hook will capture one of the bridle lines. Hook opening is sufficiently large so that the hook does not grip the line, i.e., the hook can slip lengthwise along the line. Each hook in its Closed state achieves closure with its hook base, disallowing escape of the bridle line. The state where the hooks have closed on the bridle lines is herein termed Bridle Caught Position.
6) The four hooks move toward distal positions, sliding along their captured lines and drawing down the bridle lines and the aerostat with them.
7) The four hooks cease to move distally when the aerostat makes contact with the cradles (End of Dock 706 of FIG. 7).

The foregoing description assumes of correct block-in-port fit orientation, which is achieved during the Capture phase 704 of FIG. 7. Correct fit is defined herein as the fit position that most closely aligns the aerostat with the cradles when the bridle line assembly is minimally twisted with respect to the aerostat and ground station. Since either the aerostat, the bridle block, or both are free to rotate unless the bridle block is fitted to the catch port and the aerostat is in contact with the cradles, the aerostat and bridle block will tend to spontaneously approximate to a state of least mutual twist: thus, correct bridle-block fit assures correct aerostat alignment with the ground station. Correct block-in-port fit is achieved as follows, where reference is again made to FIG. 10:

Upon the fitting of the block 908 into the port 916, each sensor (e.g., A, B, C, and D) reports to the Flight Controller 304 whether the orientation tag 914 is proximate to the sensor. The Flight Controller 304 can readily determine from this information the orientation of the bridle block 908 with respect to the catch port 916, and thus the orientation of the aerostat to the ground station (given a state of non-extreme bridle twist, i.e., less than 90 degrees). In an example, if the tag 914 is placed so that it is proximate to sensor A when the aerostat and block 908 are in correct alignment with the ground station 912, but sensor D detects proximity of the tag 914, the catch block is 90 degrees out of correct fit. In this case, the primary tether 910 may be payed out by the Flight Controller 304 of FIG. 3 by some amount to allow for free and/or forced rotation of the bridle block and aerostat toward the correct position.

Figure 13A:
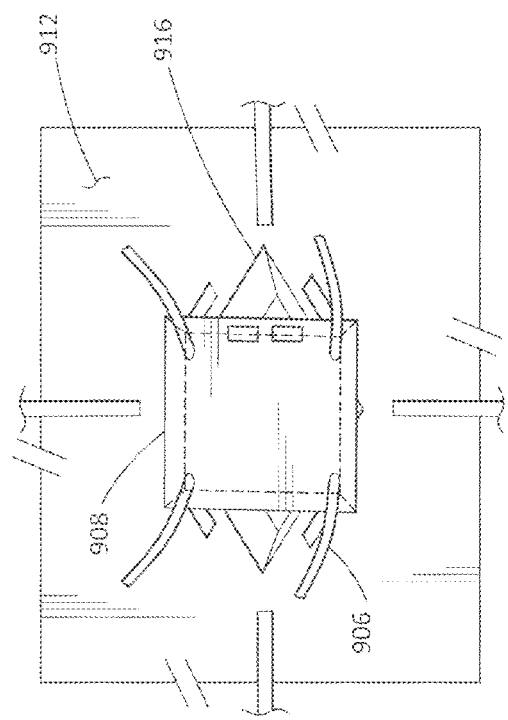
FIGS. 13A and 13B are views of a bridle-capture system in two states of operation.
Figure 13B:
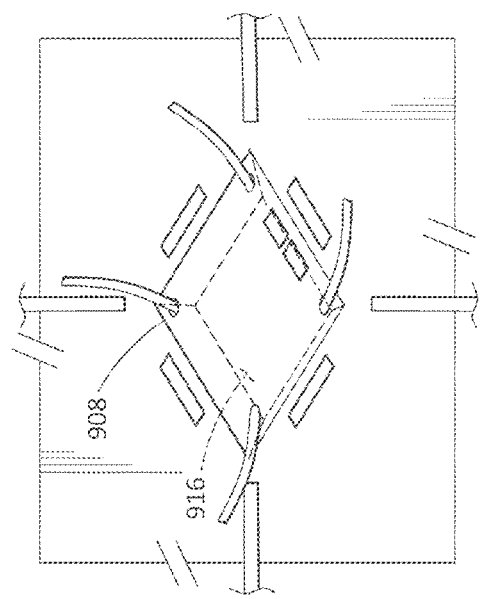

If the ground platform 912 is oriented with wind direction during docking, the aerostat 102 and thus the bridle block 908 will tend spontaneously to be aligned with the ground platform 912 and catch port 916. However, in general, upon first contact the bridle block 908 will be at least partly out of alignment with the catch port 916, both in and out of the plane of the port opening. FIG. 13A depicts a state of operation of the mechanism of FIG. 10 upon an initial, misaligned contact. Upon such contact, one or more edges of the bridle block 908 will contact one or more edges of the opening of port 916. Unless misalignment is such as to produce forces perfectly orthogonal to all points of edge contact (a case that in in various embodiments is rendered impossible by employing a non-rectangular shape for the block 908), there will be a component of force acting along the block edge at the point of contact and an equal and opposite force acting along the port edge. (Tension on the primary tether is the effective source of these forces.) These along-edge forces will be directed off-center of the bridle block 908 and will therefore exert a torque on the block 908 that will (if the forces are strong enough to overcome friction) cause it to rotate. (The port 916 will not rotate significantly if the ground station 912 is rigidly attached to the earth; or, if the upper portion of the ground station 912 is free to rotate, both the ground station 912 and bridle block 908 will rotate toward alignment in proportion to their respective moments of inertia.) As the block 908 rotates it will tend to rotate into one of its possible states of alignment with the port 916. In short, continued retraction of the primary tether tends to force the bridle block 908 to rotate until it is aligned with and enters the port 916. Rotation of the block 908 will tend to twist the bridle lines and transmit torque to the aerostat, rotating it as well. After the bridle block 908 is fitted into the catch port 916, no further retraction of the primary tether is attempted. FIG. 13B depicts the state of the mechanism of FIG. 10 after the block 908 has aligned with and fitted into the port 916.

Upon the achievement of block-into-port fitting, the sensors (e.g., A, B, C, and D) of FIG. 10 each report the proximity of the orientation tag 914. The Flight Controller 304 of FIG. 3 determines from this information the orientation of the bridle block 908 with respect to the catch port 916, and thus the approximate orientation of the aerostat to the ground station. If the bridle block 908 is out of correct orientation, the primary tether may be payed out by the Flight Controller 304 by a sufficient amount to allow for rotation (e.g., free or actuated) of the bridle block 908 (and aerostat) toward correct alignment. If the ground platform is oriented with wind direction during automated landing, the bridle block 908 and aerostat will tend spontaneously to align correctly with the ground platform 912 and catch port 916. Capture phase 704 of FIG. 7 is complete when sensors (e.g., A, B, C, and D) of FIG. 10 report that correct orientation of bridle block 908 within catch port 916 has been achieved.

Figure 14A:
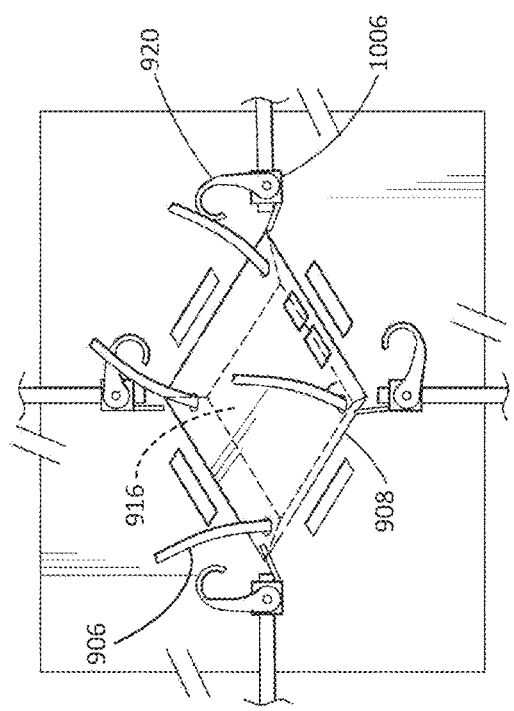
FIGS. 14A, 14B, and 14C are views of a bridle-capture system in two states of operation, showing how bridle lines are captured by hooks.
Figure 14B:
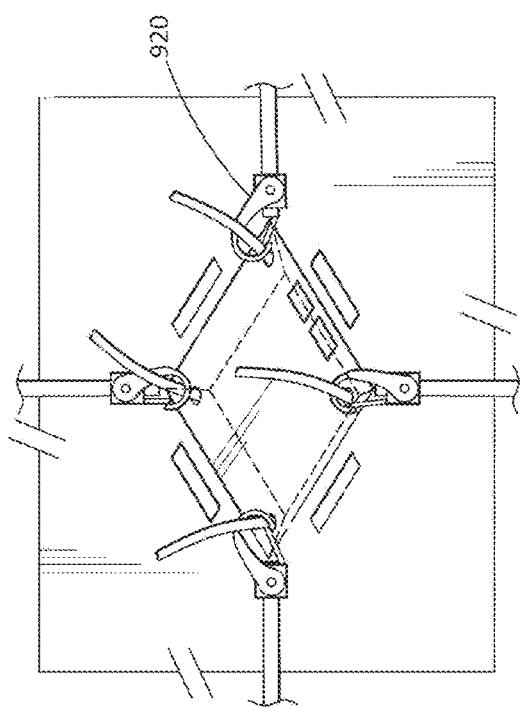
Figure 14C:
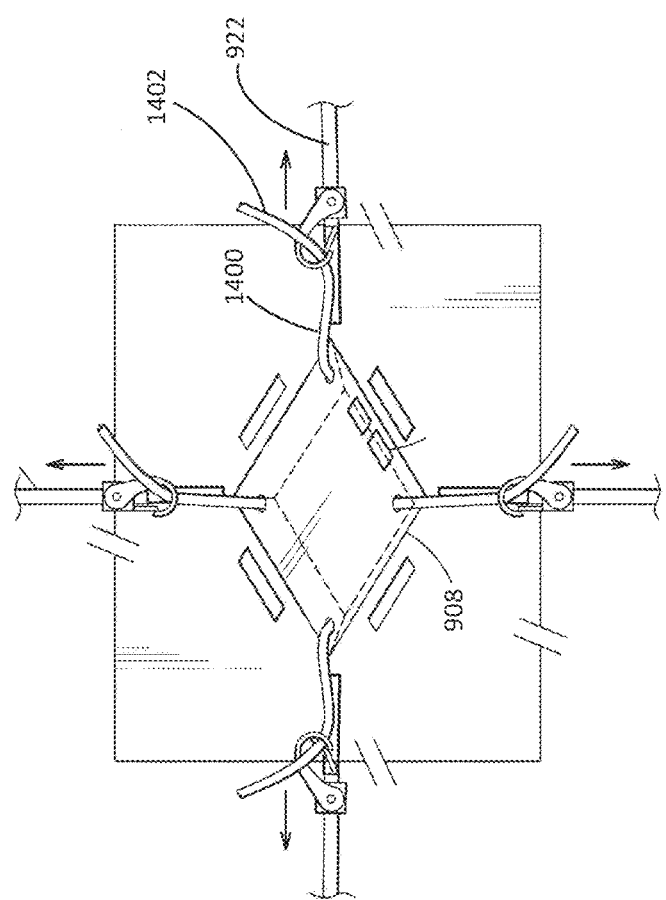

FIGS. 14A, 14B, and 14C depict in more detail the dock process 706 of FIG. 7 wherein the bridle-lines are caught by the hooks. FIG. 14A depicts the mechanism of FIG. 10 in a state of operation where the block 908 is fitted into the port 916 and the hook assemblies (e.g., hook 920, hook base 1006) have been moved to proximal positions by the corners of the block 908. That is, the hooks are in Bridle Catching Position. The hooks are sized and positioned so that their reach is ample to encircle the bridle lines (e.g., line 906) near the lines' points of attachment to the block 908 over the full feasible range of bridle-line angular position. FIG. 14B depicts the mechanism of FIG. 14A with the hooks (e.g., hook 920) closed over the bridle lines (Bridle Caught Position).

After bridle-line capture by all of the bridle spreaders, the bridle spreader assemblies are moved distally along their respective rails. This results in a portion of each bridle line being drawn down and aligned between its point of connection to a corner of the catch block and the hook assembly. Retreat of bridle spreader assemblies from the catch block thus produces drawn-down of the bridle lines and approximation of the aerostat to the ground station. Bridle spreader assembly withdrawal and bridle lines are proportioned in length to enable sufficient draw-down of the aerostat to produce firm contact with the cradle, which may comprise pads, a nose cone, and/or other ground-station components that constrain aerostat motion and enable transition to a finally secured state. It should be noted that other methods and mechanisms for retracting the bridle lines may be used to achieve substantially the same result of drawing down the aerostat to produce firm contact with the cradle. Other such mechanisms may include bridle line spools, winches, capstans, bobbins, twings, barber haulers, pinch rollers or other mechanisms or combinations of mechanisms that may have various advantages over rail systems, such as compactness.

FIG. 14C depicts the mechanism of FIG. 14A with the hook assemblies withdrawn distally from the block 908: in this state of operation the aerostat is in the process of final draw-down. FIG. 14C makes clear that the hooks slide over the lines, lengthening the portion of each line extending from the hook to the block 908 (e.g., portion 1400) and shortening the portion of the line that stretches between the hook and the aerostat (e.g., portion 1402, only partially shown).

It will be clear that launch can be accomplished by, in essence, reversing the foregoing sequence of steps, minus any need for bridle-block orientation adjustment: e.g., the bridle spreader assemblies approach the catch port, the bridle spreaders release the bridle lines, and the primary tether is payed out until launch is aborted or a flying altitude is achieved.

An illustrative docking process for an embodiment in which an aerostat is anchored by multiple tethers is now described with reference to FIGS. 1, 2A, and 2B. The aerostat 102 of FIG. 1 is connected to the ground station 104 by three tethers, namely an aft tether 116 (visible in side view of FIG. 1) and two fore tethers (e.g., tether 114; both fore tethers are visible in the Front View of FIG. 1). In various multiple-tether embodiments, the number of tethers varies from 2 to any larger number; however, the illustrative docking process here described may be readily adapted to such embodiments. A docking process for the three-tether aerostat 102 is as follows:

1) The aerostat 102 begins at flying altitude, as depicted in FIG. 2B.
2) Under the control of the Flight Controller 304 of FIG. 3, all of the tethers are reeled in simultaneously, descend phase 702 of FIG. 7. Reel-in of the tethers is not necessarily carried out uniformly: for example, if windspeed changes during drawdown of the aerostat 102, the aerostat will tend to shift farther upwind or downwind with respect to the ground station 104, and the lengths of the fore and aft tethers required to keep the aerostat within a desired range of pitch angles may vary accordingly. Thus, the software executing on the Flight Controller 304 implements a control algorithm that takes into account sensor readings of wind velocity and magnitude, aerostat attitude, estimated or measured tether length, and other inputs such as attitude set points, altitude set points or rate set points. The Flight Controller 304 may temporarily slow the retraction or pay out of one or more tethers during the drawdown process, and may also adjust aerostat control surfaces, activate propulsors aboard the aerostat, and take other measures, in order to achieve preferred aerostat flight behavior. This descent continues until the aerostat 102 is immediately above (e.g. 0.5 m) the ground station cradle 112.
3) During the capture phase 704 of FIG. 7, all the tethers are reeled in under the control of the Flight Controller until the aerostat makes initial contact with the cradle 112 of ground station 104. (In various embodiments, the cradle comprises two or more pads or other support mechanisms that enable the aerostat 102 to be in contact the ground station 102 without sustaining damage.) Initial contact is confirmed via sensors on one or more of the aerostat or ground station. Sensing may include force sensors in the cradle, tension sensors in the tether path, current sensors on the winch motor, laser distance sensors, or other means.
4) During the dock phase 706 of FIG. 7, the tethers are payed out and reeled in by a small amount as determined by the Flight Controller 304 in order to allow the aerostat 102 to settle from its initial cradle contact position into a final cradle contact position if the initial cradle contact position is not within acceptable final cradle contact position bounds. In some embodiments, predetermined sequences may be used to pay out and/or reel in tethers during the dock phase. The dock process concludes by pulling the aerostat 102 snuggly into the cradle 112. Force, optical, electrical, and/or other sensors confirm adequate contact to the Flight Controller 304, which ceases to reel in the tethers.
5) With the aerostat 102 in contact with its cradle, additional securing mechanisms such as a nose cone, gripper arms, latches, or the like may be activated (Autonomous Secure 610 of FIG. 6), if the Flight Controller's instructions or innate programming mandate that the aerostat be fully secured.

Reference is now made to the Autonomous Launch mode 604 of FIG. 6. The submodes of Autonomous Launch 604 and transitions between Autonomous Launch 604 and the other modes of the illustrative autonomous flight sequence 600 of FIG. 6 are partially depicted in FIG. 15. Autonomous Launch 604 brings the aerostat from its docked position on the ground station up to its minimum flying altitude. The autonomous launch mode includes two sub-modes, i.e., Release 1502 and Ascend 1504.

The Release process 1502, the first stage of Autonomous Launch 604, is triggered by a "launch" command from the automated Dispatch Controller 308 of FIG. 3 (transition 1508). An "abort launch" command or a "land" command from the Automated Dispatch Controller 308 may transition the system back to Docked mode 602, so long as the aerostat has not substantially begun Release 1502 (transition 1510). Once Release 1502 has substantially begun, an "abort launch" command or a "land" command will transition the system to Autonomous Land mode 608 (transition 716).

During Release 1502, the aerostat and its bridle(s), if any, are disengaged from the ground station so that the only remaining connection between the aerostat and the ground station is the one or more primary tethers. In an illustrative three-tether embodiment, Release 1502 comprises sufficient payout of the three tethers so that the aerostat disengages from the ground station cradle (e.g. all ground station pads) and remains connected to the ground station only via the three tethers. In an illustrative single-tether-with-bridle embodiment, Release 1502 comprises convergence of the bridle spreaders discussed hereinabove with reference to FIGS. 9-14C so that the aerostat rises up and disengages the cradles, followed by release of the bridle lines from the bridle spreaders, followed by disengagement of the bridle catch block from the catch port, with the end result being that the aerostat and its bridle assembly (including bridle block) are both fully disengaged from the ground station except through the single-tether connection. In various multiple-tether embodiments (e.g., that of FIG. 1), Release 1502 comprises the un-setting of any winch brakes or other mechanisms that prevent payout of the multiple tethers, followed by payout of the tethers under the control of the Flight Controller 304 of FIG. 3. The principles of aerostat control during ascent are, in an example, similar to those described for descent hereinabove with reference to FIGS. 1, 2A, and 2B.

The system transitions from Release 1502 to Ascend 1504 once the aerostat and bridle (if any) are disengaged from the ground station and the aerostat is at a certain distance above the ground station. For example, the transition could be set to occur when the aerostat is 0.5 meters above the ground station. Other suitable distances may be used, and the distance may be calculated or revised based on various data, situations, or equipment being used. This transition may occur at a certain height so that engaging the attitude-control algorithms employed during the Ascend phase 1504 avoids aerostat impact (e.g., fin impact) on the ground or ground station, e.g., by increasing aerostat pitch at an angle that causes ground conflict.

During Ascend 1504, the one or more primary tethers are payed out, allowing the aerostat to ascend to its minimum flying altitude. During ascent, tether, aerostat surface, and other actuators perform a sequence of maneuvers under the control of the Flight Controller 304 in order to increase altitude while effecting stable flight and preventing undesired behaviors.

Figure 15:
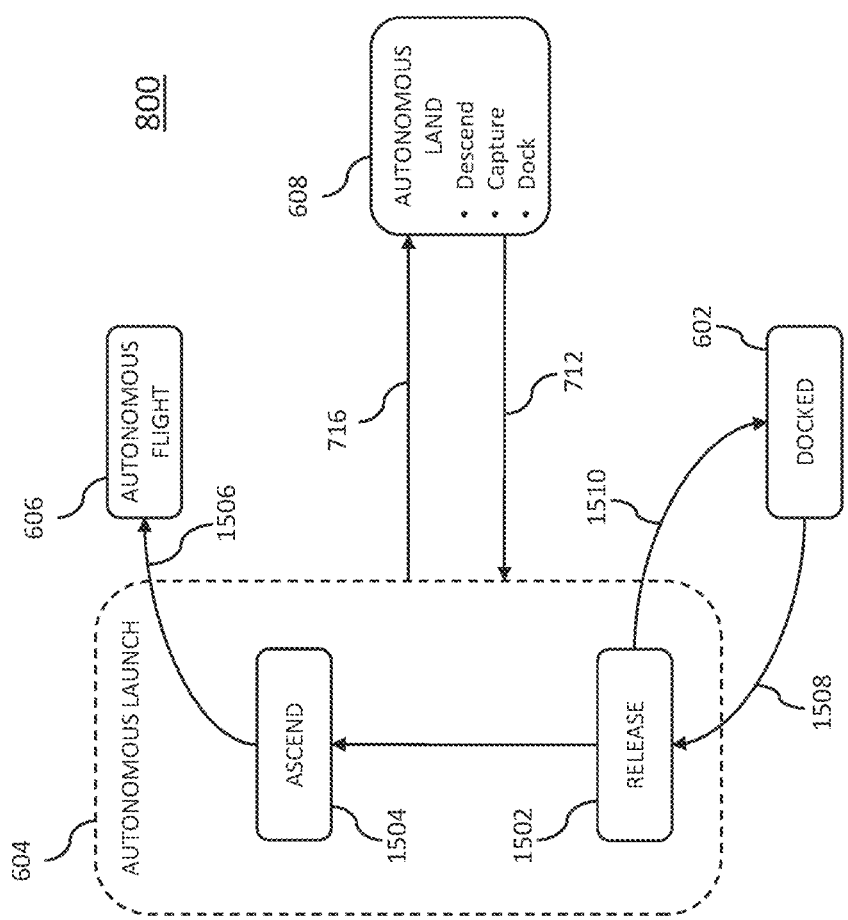
FIG. 15 is a logic diagram depicting modes of an autonomous launching sequence.

The system transitions from the Ascend 1504 to Autonomous Flight 606 upon the aerostat reaching minimum flying altitude: the transition from Ascend 1504 to Autonomous Flight 606 is depicted as transition 1506 in FIG. 15. Aerostat altitude may be measured or estimated based upon a variety of sensors, including but not limited to GPS, inertial navigation, and tether payout estimates.

The system may transition into Autonomous Launch 604 from Autonomous Land 608 (transition 712) upon an "abort land" command or "launch" command from the automated dispatch controller. In this case, the aerostat Flight Controller 304 will determine the sub-mode of autonomous launch (Release 1502 or Ascend 1504) into which the system transitions based upon the previous automated land sub-mode, current docking actuator positions, and sensor readings. The latter may include cradle force sensors, tether tensions, laser position sensors, aerostat altitude sensing or estimation, or other means.

The foregoing has been a detailed description of illustrative embodiments of the invention. Various modifications and additions can be made without departing from the spirit and scope of this invention. Each of the various embodiments described above may be combined with other described embodiments in order to provide multiple features. Furthermore, while the foregoing describes a number of separate embodiments of the apparatus and method of the present invention, what has been described herein is merely illustrative of the application of the principles of embodiments of the present invention. For example, the teachings herein are applicable to a wide range, size and type of aerostats without departing from the scope of the present invention. Shape and contour of the aerostat, number of tethers, specific actuators and docking mechanisms, and other mechanical and computational specifics are highly variable across embodiments of the invention. Accordingly, this description is meant to be taken only by way of example, and not to limit the scope of this invention.

What is claimed is:

1. A method of controlling landing of an aerostat with a computerized flight controller, the aerostat being attached to a ground station with one or more tethers, the method comprising:
   (a) retracting the one or more tethers to bring the aerostat toward the ground station during a descend phase;
   (b) upon sensing that the aerostat has descended to a distance above the ground station, automatically transitioning the flight controller to a capture mode until an initial physical contact between the ground station and the aerostat and/or bridles attached to the aerostat is sensed;
   (c) after sensing the initial physical contact of the ground station with the aerostat and/or bridles attached to the aerostat, automatically transitioning the flight controller to a dock mode during which the aerostat is moved from an initial ground station contact position to a docked position on a cradle of the ground station.

2. A method as in claim 1, further comprising:
   (d) after the aerostat is in the docked position, latching the aerostat to the ground station.

3. A method as in claim 1, further comprising the bridles, and wherein (d) comprises catching the bridles and pulling the bridles away from one another and/or downward to bring the aerostat from the initial ground station contact position to the docked position on the cradle.

4. A method as in claim 1, wherein no bridles are attached to the aerostat, the one or more tethers comprise a plurality of tethers, and (c) comprises moving the aerostat to the initial ground station contact position to the docked position on the cradle.

5. A method as in claim 1, wherein the ground station includes a rotatable platform, and further comprising rotating the rotatable platform.

6. A method as in claim 5, wherein the ground station includes one or more winches to retract the one or more tethers, and further comprising initiating retraction of the one or more tethers with a controller.

7. A method as in claim 1, further comprising:
   prior to (c), verifying physical contact of the ground station with the aerostat and/or bridles attached to the aerostat.

8. A method as in claim 1, further comprising:
   (d) using an automated dispatch controller to determine the suitability of launching of the aerostat; and
   (e) using the flight controller to launch the aerostat.

9. A method as in claim 1, further comprising:
   (d) autonomously controlling the aerostat to bring the aerostat to an attitude set point.

10. A method as in claim 9, wherein the attitude set point is adjusted during flight of the aerostat.

11. A method as in claim 9, wherein (d) comprises controlling a bridle spreader to control for attitude of the aerostat.

12. A method as in claim 1, wherein sensing initial contact of the ground station with the aerostat and/or bridles attached to the aerostat comprises sensing a proximity between an orientation tag attached to the aerostat and a sensor installed in the ground station.

13. A method as in claim 12, wherein sensing initial contact of the g round station with the aerostat and/or bridles attached to the aerostat further comprises sensing whether a bridle block attached to the aerostat is aligned with a capture port of the ground station based in part on sensing of one or more sensors around a perimeter of the capture port.

14. A method as in claim 13, in response to sensing that the aerostat is misaligned with the captured port of the ground station, retracting at least one of the tethers with an amount of force to cause a rotation of the bridle block to align with the capture port.

15. A method as in claim 1, further comprising:
during the descend phase, determining whether a position of the aerostat is outside a low-risk zone;
in response to determining that the position of the aerostat is outside the low-risk zone, automatically making one or more responses to maintain the position of the aerostat inside the low-risk zone.

16. A method as in claim 15, wherein making one or more responses comprises performing one or more operations to decrease oscillations of the aerostat.

17. A method as in claim 16, wherein the one or more operations to decrease oscillations of the aerostat comprise:
pausing descending of the aerostat to decrease oscillations of the aerostat to an acceptable magnitude;
adjusting the one or more tethers to decrease an oscillation magnitude of the aerostat;
differentially adjusting the one or more tethers to decrease oscillations of the aerostat; or
activating one or more propulsors or control surfaces on the aerostat to decrease oscillations of the aerostat.

18. A method as in claim 15, wherein the low-risk zone is defined by a shape of a cone.

* * * * *